US012572638B2

(12) United States Patent
Sammoura et al.

(10) Patent No.: US 12,572,638 B2
(45) Date of Patent: Mar. 10, 2026

(54) SPATIALLY-CONFIGURABLE LOCALIZED ILLUMINATION FOR BIOMETRIC AUTHENTICATION

(71) Applicant: Google LLC, Mountain View, CA (US)

(72) Inventors: Firas Sammoura, Dublin, CA (US); James Brooks Miller, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 37 days.

(21) Appl. No.: 18/838,796

(22) PCT Filed: Mar. 8, 2022

(86) PCT No.: PCT/US2022/071034

§ 371 (c)(1),
(2) Date: Aug. 15, 2024

(87) PCT Pub. No.: WO2023/172333

PCT Pub. Date: Sep. 14, 2023

(65) Prior Publication Data

US 2025/0156513 A1 May 15, 2025

(51) Int. Cl.
*G06F 21/00* (2013.01)
*G06F 21/32* (2013.01)
*G06V 40/12* (2022.01)

(52) U.S. Cl.
CPC .......... *G06F 21/32* (2013.01); *G06V 40/1347* (2022.01); *G06V 40/1365* (2022.01)

(58) Field of Classification Search
None
See application file for complete search history.

(56) References Cited

U.S. PATENT DOCUMENTS

| | | | |
|---|---|---|---|
| 11,132,523 B2 * | 9/2021 | Hu ..................... | G06V 40/1318 |
| 11,150,332 B1 | 10/2021 | Chen et al. | |

(Continued)

FOREIGN PATENT DOCUMENTS

| | | |
|---|---|---|
| EP | 3408794 | 12/2018 |
| WO | 2020177083 | 9/2020 |

(Continued)

OTHER PUBLICATIONS

Lin, Chenhao; Kumar, Ajay. Tetrahedron Based Fast 3D Fingerprint Identification Using Colored LEDs Illumination. IEEE Transactions on Pattern Analysis and Machine Intelligence, vol. 40, Issue: 12. https://ieeexplore.ieee.org/stamp/stamp.jsp?tp=& arnumber= 8100983 (Year: 2017).*

(Continued)

*Primary Examiner* — Jeremiah L Avery
(74) *Attorney, Agent, or Firm* — Colby Nipper PLLC

(57) ABSTRACT

This document describes systems and techniques directed at spatially-configurable localized illumination for biometric authentication systems. In aspects, during biometric authentication, a biometric authentication system having a biometric authentication manager is configured to receive user input at a touch-sensitive display. Responsive to and based on the user input, the biometric authentication manager determines a shape of a contact area of the user input at the touch-sensitive display. Based on the determined shape, the biometric authentication manager alters a brightness of a region of the display to increase a reflection of light from the user input, effective to facilitate biometric authentication.

20 Claims, 17 Drawing Sheets

(56) References Cited

U.S. PATENT DOCUMENTS

| | | | | |
|---|---|---|---|---|
| 11,194,988 | B2 * | 12/2021 | Xu | H10F 39/8053 |
| 2007/0075965 | A1 | 4/2007 | Huppi et al. | |
| 2016/0239150 | A1 | 8/2016 | Lee et al. | |
| 2016/0299615 | A1 | 10/2016 | Schwarz et al. | |
| 2017/0279948 | A1 | 9/2017 | Hong | |
| 2019/0019000 | A1 * | 1/2019 | Lee | H10F 39/198 |
| 2019/0213311 | A1 * | 7/2019 | Tussy | G06V 40/70 |
| 2019/0213312 | A1 * | 7/2019 | Tussy | G06V 40/70 |
| 2019/0266374 | A1 * | 8/2019 | Lee | G06V 10/17 |
| 2019/0303639 | A1 | 10/2019 | He et al. | |
| 2020/0042685 | A1 * | 2/2020 | Tussy | G06V 40/50 |
| 2020/0218920 | A1 * | 7/2020 | Guo | G06V 40/1318 |
| 2020/0257873 | A1 * | 8/2020 | Heo | G06V 40/1365 |
| 2020/0265208 | A1 * | 8/2020 | Wang | G06V 10/22 |
| 2020/0302142 | A1 * | 9/2020 | Liu | G06F 3/0412 |
| 2020/0342194 | A1 | 10/2020 | Bhat et al. | |
| 2020/0356210 | A1 | 11/2020 | Stone et al. | |
| 2020/0364439 | A1 * | 11/2020 | Hu | G06F 21/32 |
| 2020/0401781 | A1 * | 12/2020 | Haddad | G06V 40/1318 |
| 2021/0064843 | A1 * | 3/2021 | Ishibe | G06T 1/00 |
| 2021/0174048 | A1 * | 6/2021 | Song | G02B 17/08 |
| 2021/0271851 | A1 | 9/2021 | Chou et al. | |
| 2021/0350105 | A1 * | 11/2021 | Krenzer | G06V 40/1318 |
| 2021/0397813 | A1 * | 12/2021 | Lee | G06V 10/754 |
| 2022/0198174 | A1 * | 6/2022 | Lee | G06V 40/1318 |
| 2022/0222966 | A1 * | 7/2022 | Wang | G06V 40/1318 |
| 2022/0237274 | A1 * | 7/2022 | Paul | G06F 21/35 |
| 2024/0345682 | A1 | 10/2024 | Kim et al. | |
| 2025/0110591 | A1 | 4/2025 | Blanger et al. | |
| 2025/0336146 | A1 * | 10/2025 | Wang | G06T 15/60 |

FOREIGN PATENT DOCUMENTS

| | | |
|---|---|---|
| WO | 2021162682 | 8/2021 |
| WO | 2022134691 A1 | 6/2022 |
| WO | 2023172333 | 9/2023 |

OTHER PUBLICATIONS

Shen, Chao et al. Performance Analysis of Touch-Interaction Behavior for Active Smartphone Authentication. IEEE Transactions on Information Forensics and Security, vol. 11, Issue: 3. https://ieeexplore.IEEE.org/stamp/stamp.jsp?tp=&arnumber=7335628 (Year: 2015).*

Aronowitz, Hagai et al. Multi-modal biometrics for mobile authentication. IEEE International Joint Conference on Biometrics. https://ieeexplore.IEEE.org/stamp/stamp.jsp?tp=&arnumber=6996269 (Year: 2014).*

"Final Office Action", U.S. Appl. No. 18/397,466, Mar. 5, 2025, 21 pages.

"International Search Report and Written Opinion", Application No. PCT/US2022/071034, Nov. 3, 2022, 11 pages.

Bae, et al., "Optical Fingerprint Sensor Based on a-Si:H TFT Technology", May 2018, 4 pages.

"International Preliminary Report on Patentability", Application No. PCT/US2022/071034, Sep. 10, 2024, 7 pages.

"Non-Final Office Action", U.S. Appl. No. 18/397,466, Oct. 22, 2024, 18 pages.

* cited by examiner

Figure 2:
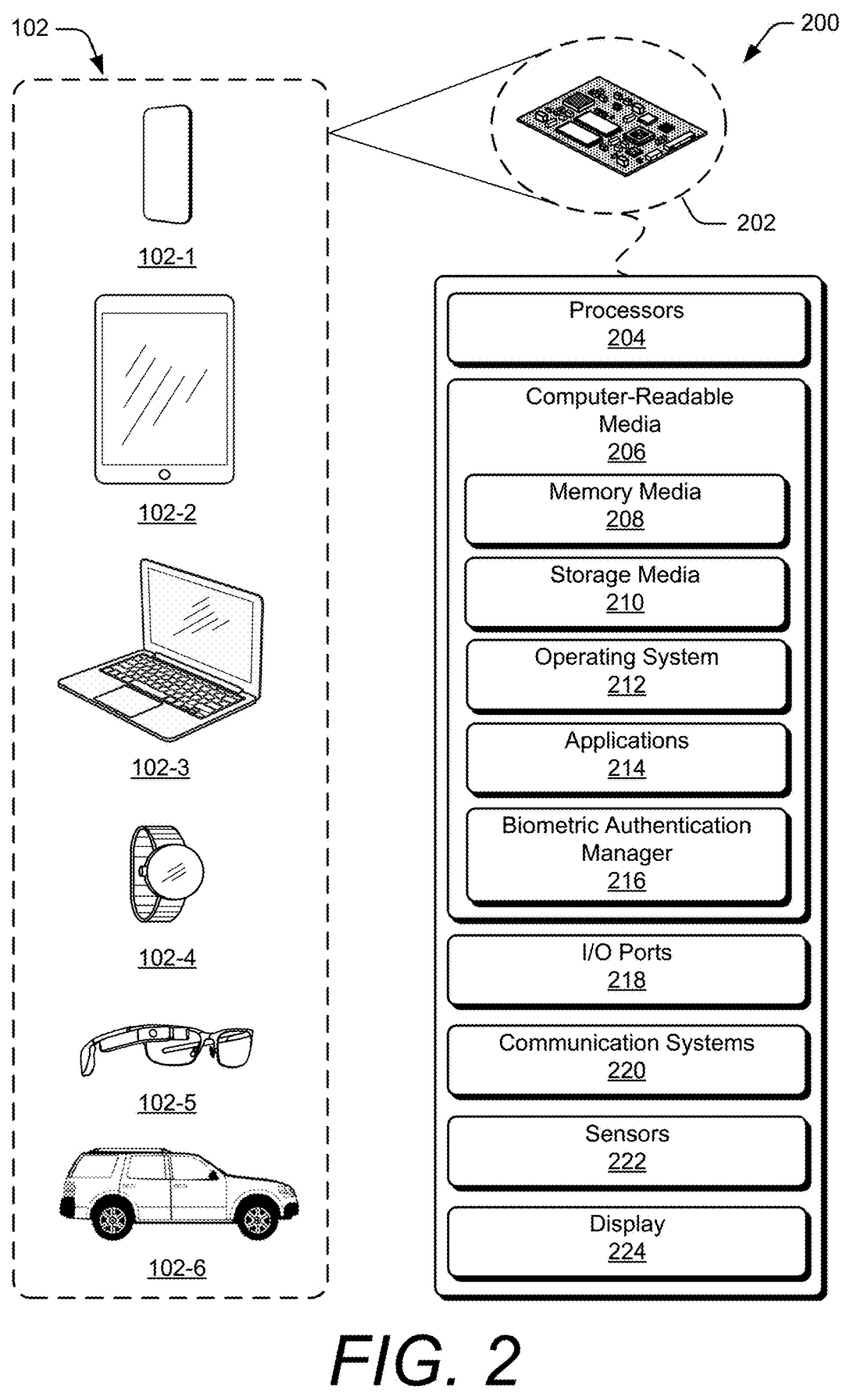

102

200

102-1

202

102-2

Processors
204

Computer-Readable
Media
206

Memory Media
208

Storage Media
210

102-3

Operating System
212

Applications
214

Biometric Authentication
Manager
216

102-4

I/O Ports
218

Communication Systems
220

102-5

Sensors
222

Display
224

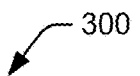
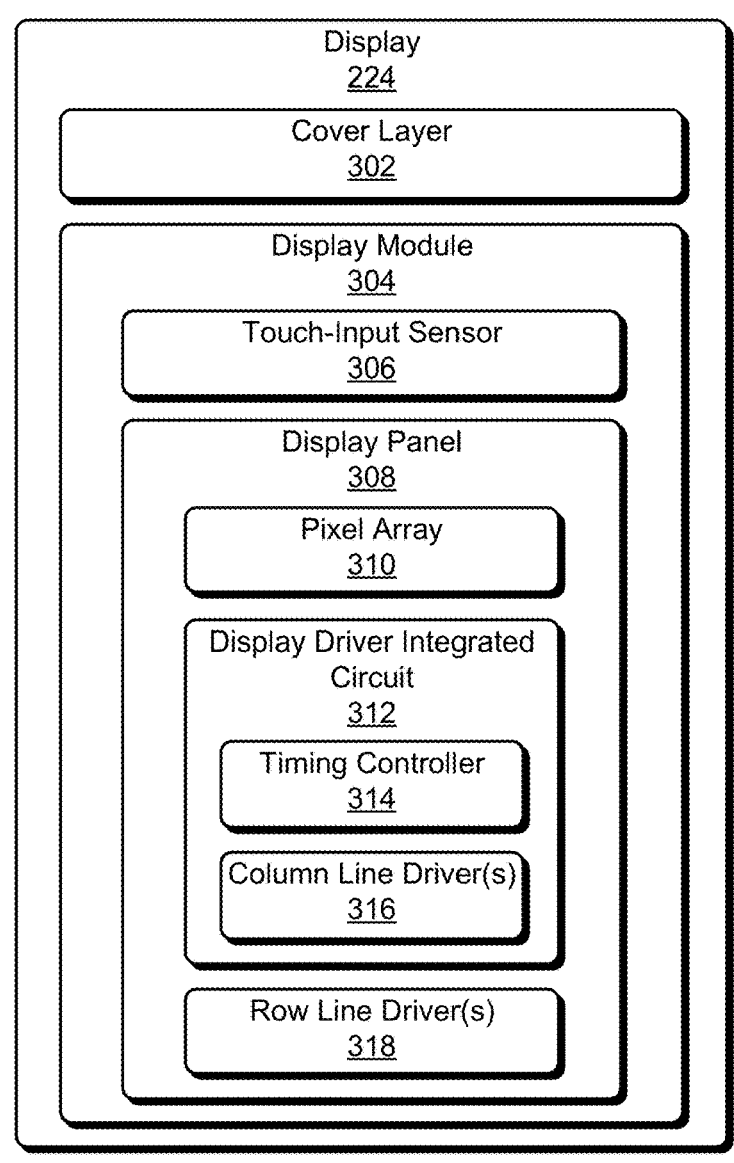
FIG. 3

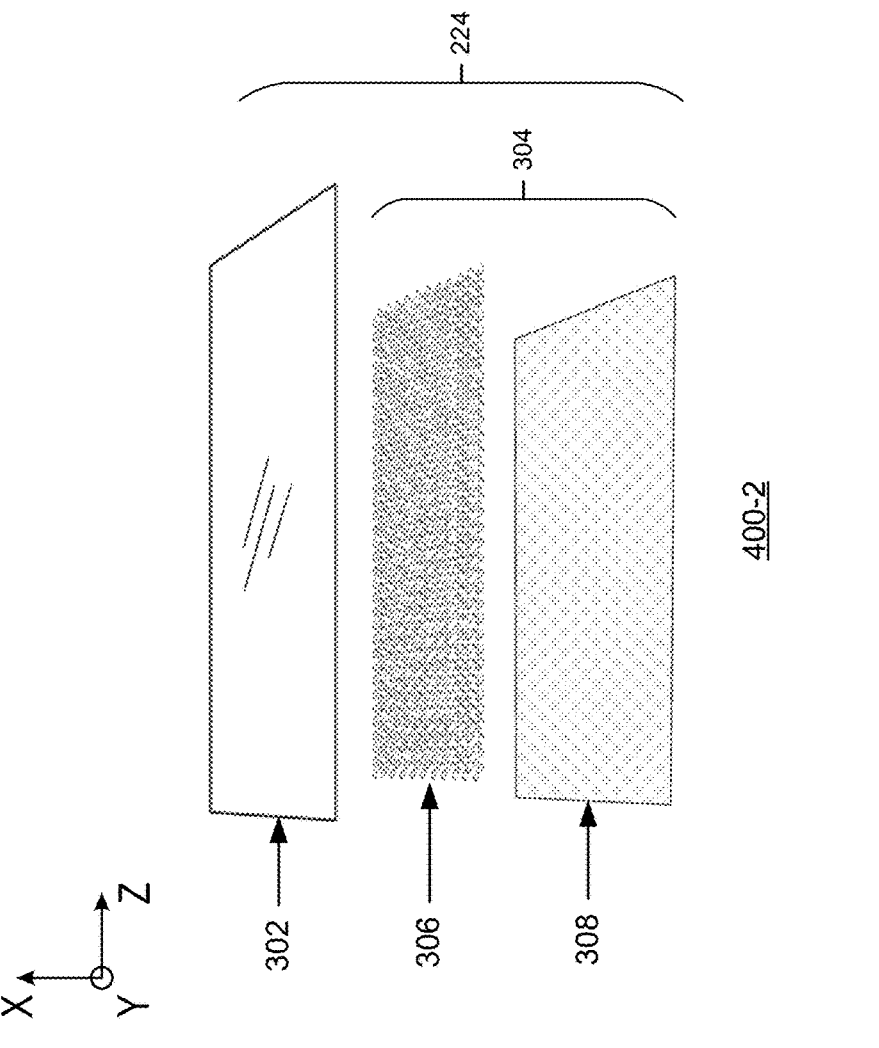
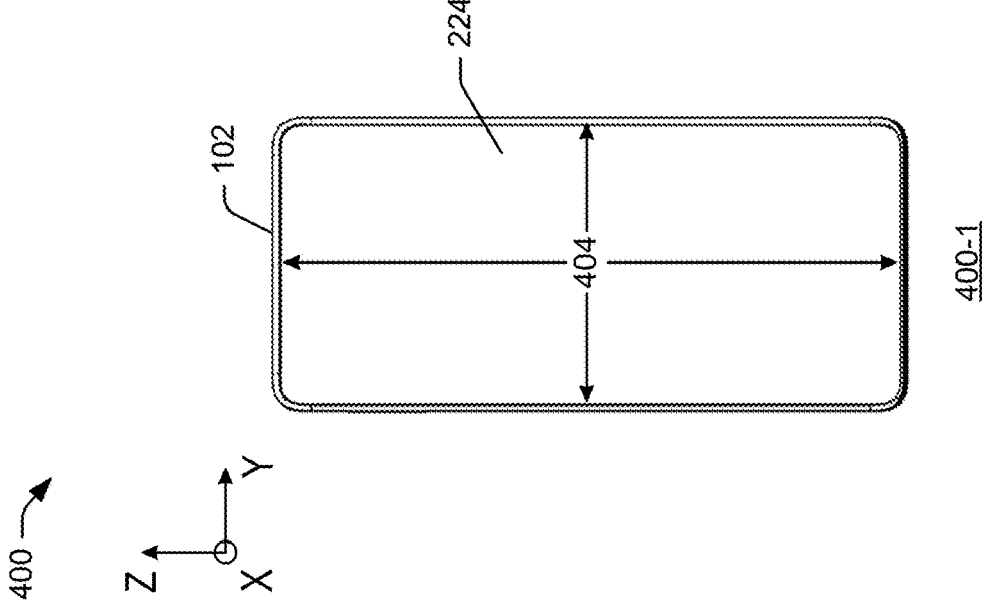
*FIG. 4*

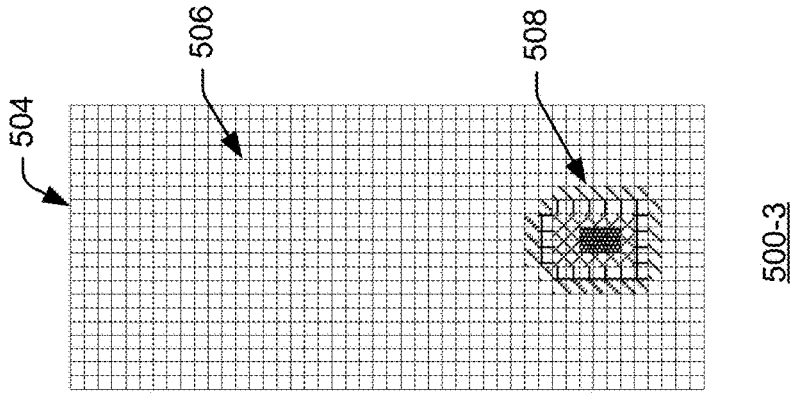
500-3
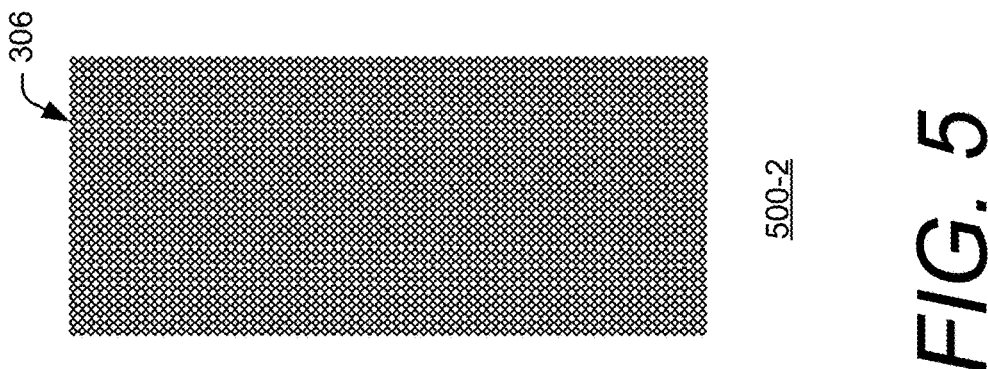
500-2
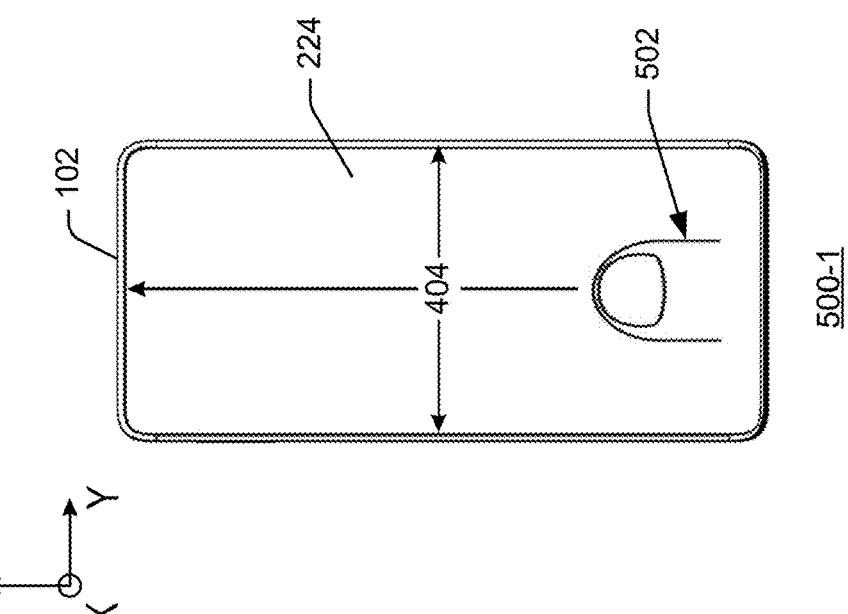
500-1
*FIG. 5*

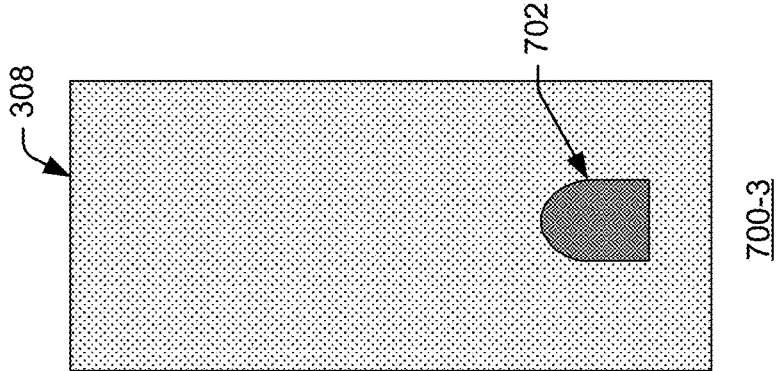
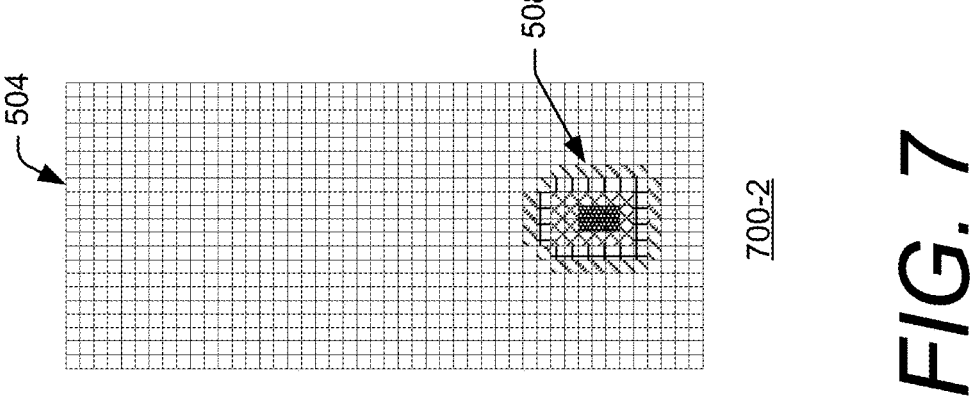
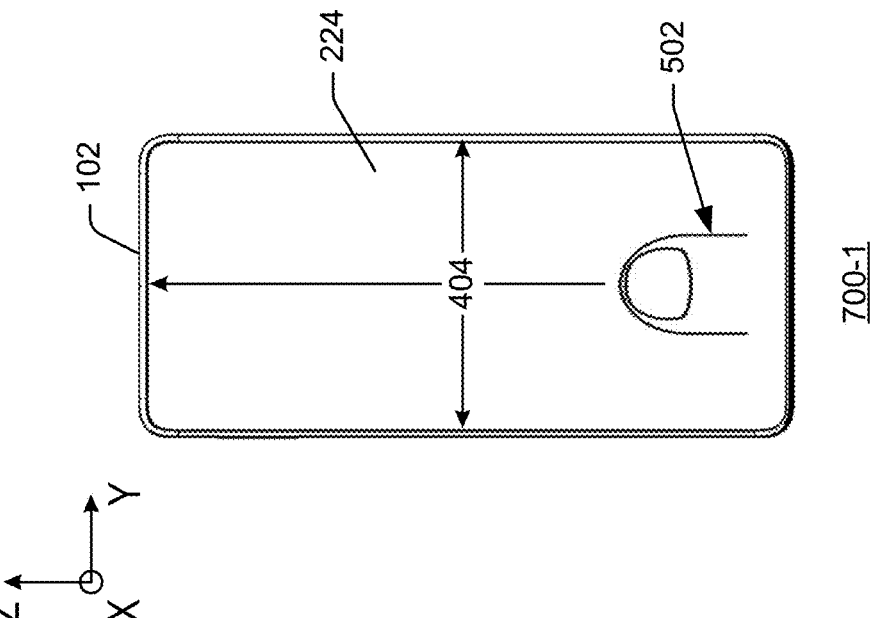
*FIG. 7*

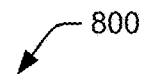
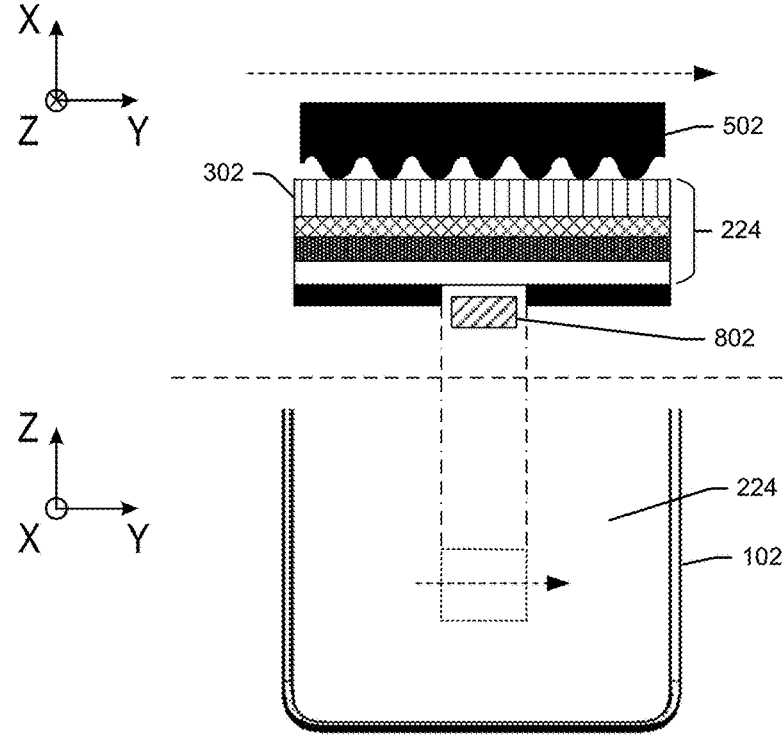
*FIG. 8*

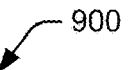

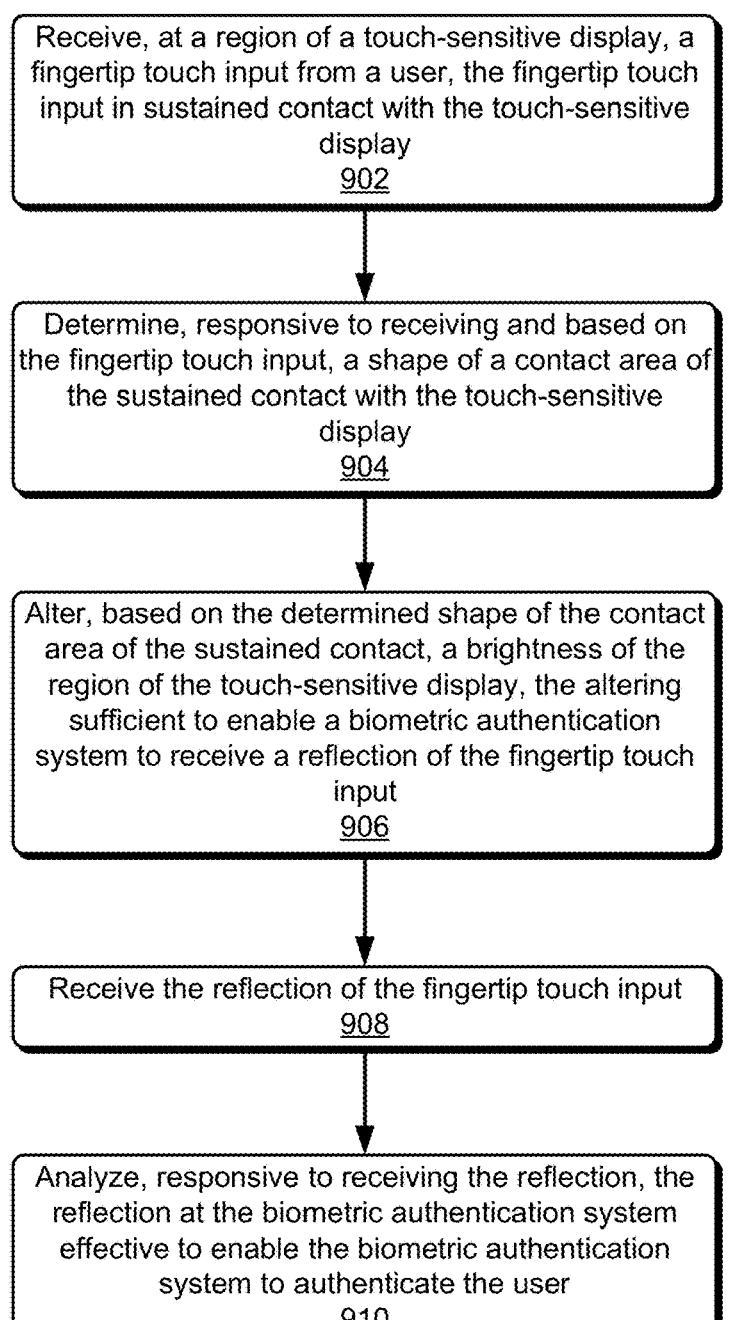

Receive, at a region of a touch-sensitive display, a fingertip touch input from a user, the fingertip touch input in sustained contact with the touch-sensitive display
902

Determine, responsive to receiving and based on the fingertip touch input, a shape of a contact area of the sustained contact with the touch-sensitive display
904

Alter, based on the determined shape of the contact area of the sustained contact, a brightness of the region of the touch-sensitive display, the altering sufficient to enable a biometric authentication system to receive a reflection of the fingertip touch input
906

Receive the reflection of the fingertip touch input
908

Analyze, responsive to receiving the reflection, the reflection at the biometric authentication system effective to enable the biometric authentication system to authenticate the user
910

*FIG. 9*

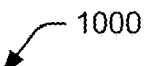

Receive, at a second region of a touch-sensitive display, a second fingertip touch input from a user, the second fingertip touch input in a second sustained contact with the touch-sensitive display
1002

Determine, responsive to receiving and based on the second fingertip touch input, a second shape of a second contact area of the second sustained contact with the touch-sensitive display
1004

Alter, based on the second determined shape of the second contact area of the second sustained contact, a second brightness of the second region of the touch-sensitive display, the altering sufficient to enable a biometric authentication system to receive a reflection of the fingertip touch input
1006

Receive the second reflection of the second fingertip touch input
1008

Analyze, responsive to receiving the reflection, the reflection at the biometric authentication system effective to enable the biometric authentication system to authenticate the user
1010

FIG. 10

SPATIALLY-CONFIGURABLE LOCALIZED ILLUMINATION FOR BIOMETRIC AUTHENTICATION

RELATED APPLICATION(S)

This application is a national stage entry of International Application No. PCT/US2022/071034, filed Mar. 8, 2022, the disclosure of which is incorporated herein by reference in its entirety.

BACKGROUND

Electronic devices continue to make significant contributions to modern society, such as in the realms of safety, transportation, communication, and many more, propelling their integration into the daily lives of users. To support integration and enhance user experience, many electronic devices are designed to provide users convenient means by which to access, control, or navigate their devices. For instance, some electronic devices permit users to speak voice commands to call family, perform in-the-air gestures to skip songs, offer biometric identifiers to unlock devices, squeeze the housing of a device to activate an intelligent virtual assistant, and many other methods of interaction to operate these devices. These methods of interaction expedite user-input and device-output techniques, enhancing user experience by enabling users to quickly and conveniently operate their device. Due to the ever-increasing integration of electronic devices into users' lives, these electronic devices must support difficult-to-penetrate, state-of-the-art physical and nonphysical (e.g., software) security systems and protocols to thwart multi-domain attacks threatening to expose user data.

Take for instance, biometric authentication systems configured to recognize biometric identifiers of users. These biometric authentication systems provide users personalized and convenient manners by which to authenticate themselves and access their devices. Since, for example, fingerprints are unique to each user, electronic devices that require fingerprint authentication as a method of access offer secure and personalized security services. Moreover, fingerprint authentication, in comparison to some other security schemes, offers a great deal of convenience, requiring little-to-no effort on behalf of the user to affirm their identity (e.g., in contrast to memorizing a password, drawing a pattern). As a result, biometric authentication systems configured to recognize biometric identifiers, such as fingerprints, of a user are often implemented in electronic devices to provide quick and effective techniques for user authentication, enhancing user experience.

SUMMARY

This document describes systems and techniques directed at spatially-configurable localized illumination for biometric authentication. In aspects, during biometric authentication, a biometric authentication system having a biometric authentication manager is configured to receive user input at a touch-sensitive display. Responsive to and based on the user input, the biometric authentication manager determines a shape of a contact area of the user input at the touch-sensitive display. Based on the determined shape, the biometric authentication manager alters a brightness of a region of the display to increase a reflection of light from the user input, effective to facilitate biometric authentication.

In some aspects, a method is disclosed for spatially-configurable localized illumination for biometric authentication. The method includes receiving, at a region of a touch-sensitive display, a fingertip touch input from a user, the fingertip touch input in sustained contact with the touch-sensitive display. In an example, a user may place a thumb on a touch-sensitive display. Further, the method includes determining, responsive to receiving and based on the fingertip touch input, a shape of a contact area of the sustained contact with the touch-sensitive display. The shape may be any two-dimensional shape corresponding to a contact area of the sustained contact with the touch-sensitive display. In addition, the method includes altering, based on the determined shape of the contact area of the sustained contact, a brightness of the region of the touch-sensitive display (e.g., increasing the brightness of the region relative to the portion of the touch-sensitive display outside the region), the altering sufficient to enable a biometric authentication system to receive a reflection (e.g., an improved reflection) of the fingertip touch input. The method also includes receiving the reflection of the fingertip touch input and analyzing, responsive to receiving the reflection, the reflection at the biometric authentication system effective to enable the biometric authentication system to authenticate the user.

In further aspects, an electronic device is disclosed. The electronic device includes an electronic visual display, one or more processors, and memory. The memory stores instructions that, when executed by the one or more processors, cause the one or more processors to implement a biometric authentication manager to provide spatially-configurable localized illumination for biometric authentication, by performing the method above.

The details of one or more implementations are set forth in the accompanying drawings and the following description. Other features and advantages will be apparent from the description, the drawings, and the claims. This Summary is provided to introduce subject matter that is further described in the Detailed Description. Accordingly, a reader should not consider the Summary to describe essential features nor threshold the scope of the claimed subject matter.

BRIEF DESCRIPTION OF THE DRAWINGS

The details of one or more aspects for spatially-configurable localized illumination for biometric authentication are described in this document with reference to the following drawings:

FIG. 2 illustrates an example implementation of the example electronic device from FIG. 1, which is configured to implement spatially-configurable localized illumination for biometric authentication;

FIG. 3 illustrates an example implementation of the display from FIG. 2 in more detail;

FIG. 4 illustrates an example implementation of the example electronic device having the display manufactured as a display panel stack;

FIG. 5 illustrates an example implementation of the example electronic device having an example touch-input sensor configured to detect user input;

FIG. 7 illustrates an example implementation of the example electronic device having the display panel configured to implement spatially-configurable localized illumination for biometric authentication;

FIG. 8 illustrates an example implementation of the example electronic device including a biometric authentication system having a fingerprint sensor configured to receive a reflection of user input illuminated by spatially-configurable localized illumination;

FIG. 9 depicts a method for enabling spatially-configurable localized illumination for biometric authentication;

FIG. 10 depicts a method for enabling spatially-configurable localized illumination for biometric authentication;

The use of same numbers in different instances may indicate similar features or components.

DETAILED DESCRIPTION

Overview

Figure 1:
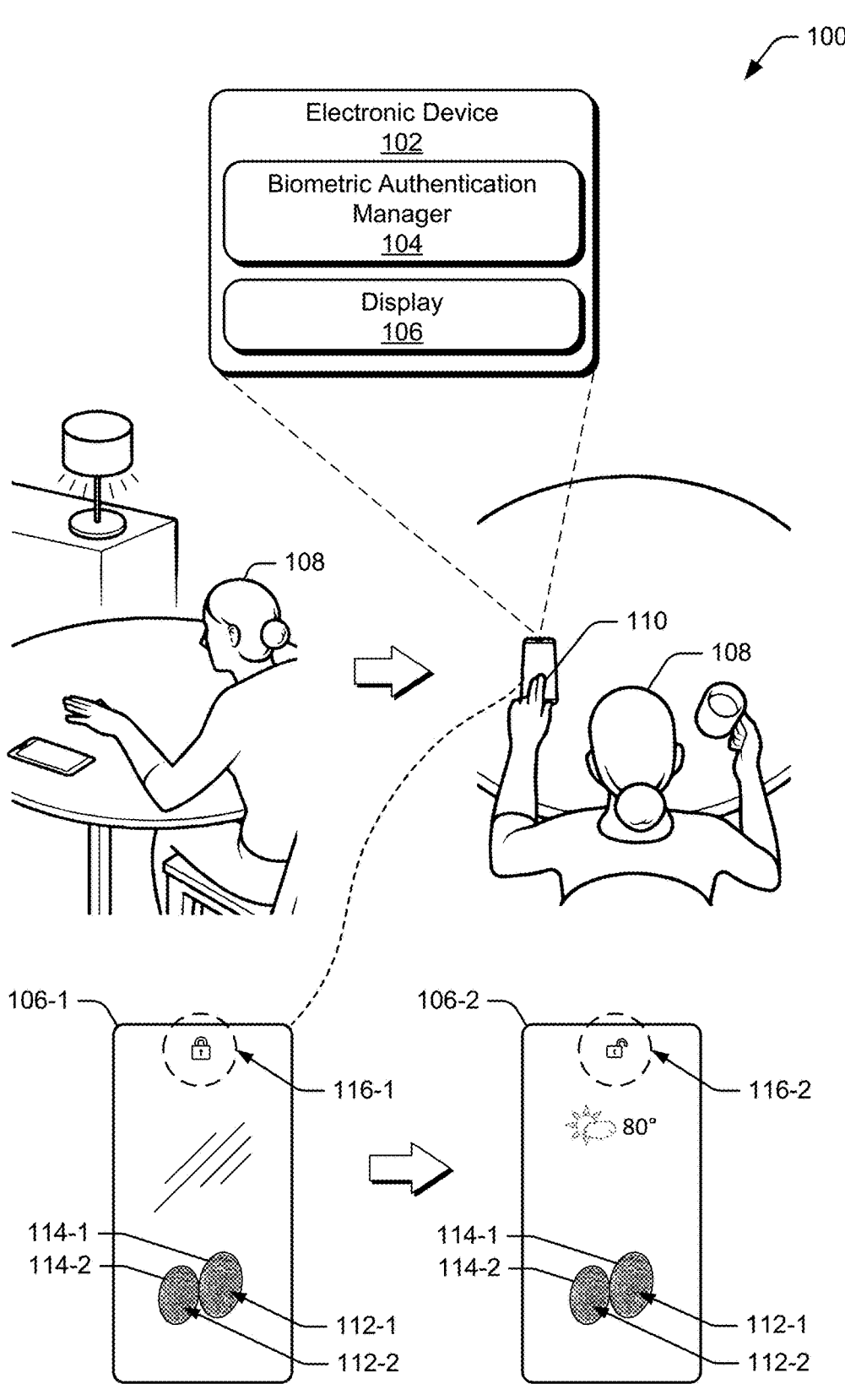
FIG. 1 illustrates an example implementation of an example electronic device having a biometric authentication manager and a display configured to provide spatially-configurable localized illumination for biometric authentication.

Many electronic devices (e.g., smartphones, desktops, smartwatches) include an electronic visual display, often simply referred to as a display or screen, integrated as a portion of the electronic device's housing. Electronic device manufacturers fabricate these displays in a layered structure ("display panel stack"), containing a cover layer (e.g., cover glass) and a display module having a display panel.

Display panels increasingly rely on organic light-emitting diode (OLED) technology (e.g., an active-matrix OLED (AMOLED) display), utilizing tens of thousands of pixel circuits each having an organic light-emitting diode ("pixel"). Electronic devices can control any of the pixels within a display panel to illuminate at various intensities and wavelengths, effective to produce on-screen content (e.g., images). By exploiting a feature of the human eye and brain referred to as persistence of vision (e.g., retinal persistence), a display panel can redraw on-screen content at predetermined frequencies ("refresh rate") to save power, change on-screen content (e.g., scrolling) seamlessly, and give an illusion of on-screen content as images in motion (e.g., video). For example, a display panel configured to operate at a 120 hertz (Hz) refresh rate can redraw on-screen content 120 times per second. OLED displays, in comparison to other display technologies, include many advantages such as quick refresh rates, small display response times, and low power consumption. These benefits make OLED displays well-suited for electronic devices and are, therefore, highly prized by users for their image quality.

In addition, electronic devices may include one or more biometric recognition systems. Some electronic devices are configured having one or more biometric recognition systems disposed underneath, or within, the display panel stack, including beneath the cover layer and one or more layers (e.g., all layers, one layer) of the display module. For example, to provide a high screen-to-body ratio and, thereby, preserve space on a display side of an electronic device, manufacturers may embed under-display fingerprint sensors (UDFPS) beneath a display module. Users may then be afforded the opportunity to provide user input (e.g., a finger having a fingerprint, a fingertip touch input) to authenticate themselves to one or more applications or an operating system implemented on the electronic device. If the authentication is successful, then the user can gain access to a plurality of resources offered by the one or more applications or the operating system. Users authenticating themselves to an electronic device using at least one biometric identifier is referred to herein as biometric authentication.

Electronic devices configured to perform biometric authentication using an UDFPS may utilize pixels within one or more regions of the OLED display to illuminate a user input. Due to a low transmissibility of light from an external environment through the display panel to the UDFPS, capturing a well-illuminated user input can be difficult. For example, a display may have a visible light transmission (VLT) (e.g., the measurement of light transmission through a given medium) of less than 5%, resulting in sub-optimal image capturing of the user input on the part of the UDFPS. As a result, electronic devices may implement a localized high-luminance region ("high-luminance region") in one or more regions of a display panel to better illuminate user input. Through such a technique, the electronic device may facilitate UDFPS sensing of user input (e.g., fingers having a fingerprint) by implementing a high-luminance region.

However, in many instances, depending on the electronic device and its configuration, high-intensity light radiating from a high-luminance region can irradiate on a user's eye(s) during biometric authentication. Such an event may be frustrating, or even discomforting, to users of electronic devices, lessening their user experience. Many electronic devices are configured having a spatially-fixed fingerprint sensing region. For example, the fingerprint sensing region may be within a bottom portion of a display. Further, the high-luminance region may be defined on a fixed location on the display and may form several morphous shapes including rectangles and ellipses. As a result, if a finger does not sufficiently cover the high-luminance region (e.g., a finger that is in a wrong location, a finger that is too small), the high-intensity light from the high-luminance region may shine in the user's eye(s).

As an example, a user laying down in her bed at night may wish to text on her device, which is resting on a nearby nightstand. To authenticate herself to her electronic device and access a messaging application, she may pick up her electronic device and naturally look at a screen of the device. By placing a finger on the screen, the electronic device may commence a biometric authentication event, resulting in an increase in luminosity from no brightness to high brightness in a high-luminance region. In such a scenario, and others like it, if her finger does not sufficiently cover the high-luminance region, then the radiating light from the high-luminance region may cause her to be momentarily blinded.

In some configurations, the high-luminance region may not immediately illuminate at full luminosity, but instead may illuminate at a substantially high enough luminosity so as to enable reflected light from the finger to transmit through one or more layers of the display panel stack for receipt by a sensor (e.g., an UDFPS). Despite this, the radiation of light from the display, including the high-luminance region, necessary for a sensor to identify a finger or a location of the finger, may be uncomfortably bright to users, especially in a dark environment. Further, such a configuration may consume additional electrical power, as well as increase processing time for biometric authentication.

In contrast, this document describes systems and techniques directed at spatially-configurable localized illumination for biometric authentication. In aspects, an electronic device having a display stack and a biometric authentication system, such as an under-display fingerprint sensor, includes a biometric authentication manager configured to receive user input at a touch-sensitive display, determine a shape of the user input, and alter a brightness of a display to enable a biometric authentication system to receive a reflection (e.g., an improved reflection) of the user input.

The following discussion describes operating environments, techniques that may be employed in the operating environments, and example methods. Although techniques using and apparatuses for spatially-configurable localized illumination for biometric authentication are described, it is to be understood that the subject of the appended claims is not necessarily limited to the specific features or methods described. Rather, the specific features and methods are disclosed as example implementations and reference is made to the operating environment by way of example only.

Example Device

FIG. 1 illustrates an example implementation 100 of an example electronic device 102 having a biometric authentication manager 104 and a display 106 configured to provide spatially-configurable localized illumination for biometric authentication. In one example, as illustrated in FIG. 1, a user 108 sitting at a table for morning coffee in a low-lit room desires to look at her phone (e.g., electronic device 102) to view daily updates, weather, messages, news, and so on. To access her phone and view daily content, she places two fingers 110, each having a unique fingerprint (e.g., fingerprint 112-1, fingerprint 112-2), on the display 106 of her phone.

In response to the user 108 placing her two fingers 110 on the display 106, the biometric authentication manager 104 detects the two fingers 110 (e.g. using a touch-input sensor associated with the screen) and determines a shape 114 (e.g., shape 114-1, shape 114-2) for each portion of her two fingers 110 in sustained contact a with the display 106. The sustained contact may be defined by, for example, any duration of time sufficient for the biometric authentication manager 104 to detect the two fingers 110, analyze the two fingers 110, determine the shape 114 of the two fingers 110, and/or authenticate the user 108. In some examples, the biometric authentication manager 104 using one or more sensors may be configured to detect the presence of the finger(s) without a sustained contact of the finger(s) on the display. For example, the finger(s) may be situated within a threshold distance of the display (e.g. for at least the predetermined threshold time). The biometric authentication manager 104 further determines, based on shape 114-1 and shape 114-2, two regions (not illustrated) of the display 106. The two regions of the display are substantially collocated with the portions of her two fingers 110 in sustained contact with the display 106.

In some examples, shape 114-1 and shape 114-2 may be substantially similar (e.g., equal in area, same size) to the corresponding regions of the display 106. In additional examples, the biometric authentication manager may determine (e.g., select, identify) regions differing in size (e.g., smaller than but similar to) and/or in shape (e.g. not similar to) the corresponding shapes 114-1 and 114-2. For example, the regions may be smaller than the corresponding shapes, and entirely located within the shapes, with the perimeter of the regions being offset within a perimeter of the shapes, to minimize the risk of light escaping.

The biometric authentication manager 104 may then implement (e.g., directly, indirectly), at the display 106, a high-luminance region (not illustrated) at each of the two regions. Each high-luminance region may be similarly shaped to each corresponding shape 114-1 and shape 114-2. As a result, the two fingers 110, each with their respective fingerprint 112, can be illuminated with a high-intensity light, so as to facilitate fingerprint sensing. Provided the sensed fingerprints 112 of the user 108 indicate likeness to previously enrolled fingerprints, the biometric authentication manager 104 can transfer the phone from a locked state 116-1 to an unlocked state 116-2, permitting the user 108 access to resources (e.g., applications) of the phone.

In more detail, consider FIG. 2, which illustrates an example implementation 200 of the example electronic device from FIG. 1, which is configured to implement spatially-configurable localized illumination for biometric authentication. The electronic device 102 is illustrated with a variety of example devices, including consumer electronic devices. As non-limiting examples, the electronic device 102 can be a smartphone 102-1, a tablet device 102-2, a laptop computer 102-3, a computerized watch 102-4, smart glasses 102-5, and an automotive vehicle 102-6. Although not shown, the electronic device 102 may also be implemented as any of a mobile station (e.g., fixed- or mobile-STA), a mobile communication device, a client device, a home automation and control system, an entertainment system, a gaming console, a personal media device, a health monitoring device, a drone, a camera, an Internet home appliance capable of wireless Internet access and browsing, an IoT device, security systems, and the like. Note that the electronic device 102 can be wearable, non-wearable but mobile, or relatively immobile (e.g., desktops, appliances). Note also that the electronic device 102 can be used with, or embedded within, many electronic devices 102 or peripherals, such as in automobiles or as an attachment to a laptop computer. The electronic device 102 may include additional components and interfaces omitted from FIG. 2 for the sake of clarity.

As illustrated, the electronic device 102 includes a printed circuit board assembly 202 (PCBA 202) on which components and interconnects of the electronic device 102 are embodied. In implementations, the PCBA 202 may include multiple printed circuit boards operably coupled together via, for example, electrical wiring. Alternatively or additionally, components of the electronic device 102 can be embodied on other substrates, such as flexible circuit material or other insulative material. Generally, electrical components and electromechanical components of the electronic device 102 are assembled onto a printed circuit board (PCB) to form the PCBA 202. Various components of the PCBA 202 (e.g., processors and memories) are then programmed and tested to verify the correct function of the PCBA 202. The PCBA 202 is connected to or assembled with other parts of the electronic device 102 into a housing.

As illustrated, the PCBA 202 includes one or more processors 204 and computer-readable media 206. The processors 204 may include any suitable single-core or multi-core processor (e.g., an application processor (AP), a digital-signal-processor (DSP), a central processing unit (CPU), graphics processing unit (GPU)). The computer-readable media 206 includes memory media 208 and storage media 210. The operating system 212, applications 214, and bio-metric authentication manager 216 implemented as com-puter-readable instructions on the computer-readable media 206 can be executed by the processors 204 to provide some or all of the functionalities described herein. For example, the processors 204 may perform specific computational tasks of the operating system directed at controlling the creation and display of on-screen content on a display. In still another example, the processors 204 may execute instructions of the operating system to implement a display refresh rate of 120 Hz. The computer-readable media 206 may include one or more non-transitory storage devices such as a random access memory, hard drive, solid-state drive (SSD), or any type of media suitable for storing electronic instructions, each coupled with a computer system bus. The term "coupled" may refer to two or more elements that are in direct contact (physically, electrically, magnetically, opti-cally, etc.) or to two or more elements that are not in direct contact with each other, but still cooperate and/or interact with each other.

In additional aspects, various implementations of the biometric authentication manager 216 can include a System-on-a-Chip (SoC), one or more integrated circuits (ICs), a processor with embedded processor instructions or config-ured to access processor instructions stored in memory, hardware with embedded firmware, a printed circuited board with various hardware components, or any combination thereof. As described herein, a biometric authentication system may include one or more components of the elec-tronic device 102, as illustrated in FIG. 1, configured to perform biometric authentication. In additional implemen-tations, the biometric authentication system may be imple-mented as the electronic device 102.

The PCBA 202 may also include input/output (I/O) ports 218 and communication systems 220. The I/O ports 218 allow the electronic device 102 to interact with other devices or users through peripheral devices, conveying any combi-nation of digital signals, analog signals, and radio-frequency (RF) signals. The I/O ports 218 may include any combina-tion of internal or external ports, such as universal serial bus (USB) ports, audio ports, Serial ATA (SATA) ports, PCI-express based ports or card-slots, secure digital input/output (SDIO) slots, and/or other legacy ports. Various peripherals may be operatively coupled with the I/O ports 218, such as human-input devices (HIDs), external computer-readable storage media, or other peripherals.

The communication systems 220 enable communication of device data, such as received data, transmitted data, or other information as described herein, and may provide connectivity to one or more networks and other devices connected therewith. Example communication systems include NFC transceivers, WPAN radios compliant with various IEEE 802.15 (Bluetooth®) standards, WLAN radios compliant with any of the various IEEE 802.11 (WiFi®) standards, WWAN (3GPP-compliant) radios for cellular telephony, wireless metropolitan area network (WMAN)

radios compliant with various IEEE 802.16 (WiMAX®) standards, infrared (IR) transceivers compliant with an Infrared Data Association (IrDA) protocol, and wired local area network (LAN) Ethernet transceivers. Device data communicated over communication systems 220 may be packetized or framed depending on a communication pro-tocol or standard by which the electronic device 102 is communicating. The communication systems 220 may include wired interfaces, such as Ethernet or fiber-optic interfaces for communication over a local network, private network, intranet, or the Internet. Alternatively or addition-ally, the communication systems 220 may include wireless interfaces that facilitate communication over wireless net-works, such as wireless LANs, cellular networks, or WPANs.

Although not shown, the electronic device 102 can also include a system bus, interconnect, crossbar, or data transfer system that couples the various components within the device. A system bus or interconnect can include any one or combination of different bus structures, such as a memory bus or memory controller, a peripheral bus, a universal serial bus, and/or a processor or local bus that utilizes any of a variety of bus architectures.

The PCBA 202 may further include, or be connected to, one or more sensors 222 disposed anywhere on or in the electronic device 102. In some examples, the sensors 222 may be disposed on or in a peripheral input device connected (e.g., wired, wirelessly) to the electronic device 102. The sensors 222 can include any of a variety of sensing compo-nents, such as an audio sensor (e.g., a microphone), a touch-input sensor (e.g., a touchscreen), an image-capture device (e.g., a camera, video-camera), proximity sensors (e.g., capacitive sensors), an ambient light sensor (e.g., photodetector), and/or an under-display fingerprint sensor (UDFPS). The UDFPS can be implemented as an optical UDFPS or as an ultrasonic UDFPS. The UDFPS can be disposed within a housing of the electronic device 102, embedded underneath or within a display. In implementa-tions, the PCBA 202 can include more than one UDFPS.

Further, the touch-input sensor may be implemented underneath or within a display. As described herein, a display utilizing one or more touch-input sensors is referred to herein as a touch-sensitive display. The touch-input sensor may be implemented as any of a 5-wire resistive touch panel, a surface capacitive touch panel, a projected capaci-tive (P-Cap) touch panel, a surface acoustic wave (SAW) touch panel, an infrared (IR) touch panel, a force touch sensor touch panel, and so on. The touch-input sensor may be a transparent substrate.

The electronic device 102 further includes a display 224 (e.g., display 106). Although an organic light-emitting diode (OLED) display is described herein, it is provided as an example only. The electronic device 102 may include or utilize any of a variety of displays, including an active-matrix OLED (AMOLED) display, an electroluminescent display (ELD), a microLED display, a liquid crystal display (LCD), a thin film transistor (TFT) LCD, an in-place switch-ing (IPS) LCD, and so forth. The display 224 may be referred to as a screen, such that content may be displayed on-screen.

FIG. 3 illustrates an example implementation 300 of the display 224 from FIG. 2 in more detail. Although FIG. 3 shows various entities and components as part of the display 224, any of these entities and components may be separate from, but communicatively coupled to, the display 224.

In FIG. 3, the display 224 may include a cover layer 302 and a display module 304. The cover layer 302 may be composed of any of a variety of transparent materials including polymers (e.g., plastic, acrylic), glass (e.g., tempered glass), and so forth, forming any three-dimensional shape (e.g., polyhedron), such as a rectangular prism or cylinder. During manufacturing, a bottom face of the cover layer 302 may be bonded (e.g., glued) to the display module 304 to protect the display module 304 and serve as a barrier to ingress contaminants (e.g., dust, water).

The display module 304 may include a touch-input sensor 306 and a display panel 308. The display panel 308 may include a pixel array 310 of thousands (or millions) of pixel circuits (e.g., low-temperature polycrystalline oxide (LTPO) pixel circuits), forming any two-dimensional grid (e.g., rectangular grid, circular grid, curved grid). Each pixel circuit may include a light-emitting component, such as one or more light-emitting diodes (LEDs), commonly referred to as a pixel.

The display panel 308 may further include a display driver integrated circuit 312 (DDIC 312). The DDIC 312 may include a timing controller 314 and column line driver(s) 316. The column line driver 316 may include, as a non-limiting example, a data-line driver. The display panel 308 may further include row line drivers 318. The row line drivers 318 may include, as non-limiting examples, gate-line drivers, scan-line drivers, and/or emission-control drivers.

The display panel stack may further include, often integrated within the display module, but sometimes altogether separate of the display module, a collimator, one or more polarizer layers (e.g., polarization filters), one or more adhesive layers (e.g., glue), and a protective layer (e.g., a EMBO layer). The protective layer may include one or more layers, such as a polymer layer (e.g., polyethylene terephthalate (PET) substrate), a metallic layer (e.g., copper layer, stainless steel layer), a foam pad, and an adhesive layer. The protective layer may be on the bottom of the display panel stack (e.g., opposite the cover layer 302), providing protection from, for example, moisture, debris, and/or radiation (e.g., electromagnetic radiation, heat radiation).

FIG. 4 illustrates an example implementation 400 of the example electronic device 102 (e.g., smartphone 102-1) having the display 224 manufactured as a display panel stack. As illustrated in detail view 400-1, the electronic device 102 includes at one least layer of the display 224 (e.g., the cover layer 302) integrated as one or more portions of a housing of the electronic device 102. The display 224 includes an active area 404 that may be visible and/or accessible to touch by users.

Detail view 400-2 illustrates an exploded view of the display 224. For clarity in the detail view, some components of the display 224 may be omitted. As illustrated, the display 224 includes cover layer 302 disposed as a top layer and a display module 304 disposed thereunder. The display module 304 includes the touch-input sensor 306 disposed beneath the cover layer 302 and the display panel 308 disposed beneath the touch-input sensor 306.

In such a configuration, light emitting from the display panel 308 can pass through the touch-input sensor 306 and the cover layer 302 for viewing by users within the active area 404. Further, users can provide user input on or above the cover layer 302, within the active area 404, for receipt by one or more sensors. For example, users can provide user input on the cover layer 302, within the active area 404, for receipt (e.g., detection) by the touch-input sensor 306.

As described herein, user input may include any physical or behavioral characteristic provided (directly or indirectly) by a user from which biometric identifiers (e.g., biological characteristics) can be derived. As non-limiting examples, biometric identifiers can include fingerprints, irises, palms, voice, facial structure, and others.

FIG. 5 illustrates an example implementation 500 of the example electronic device 102 having an example touch-input sensor 306 configured to detect user input. As illustrated in detail view 500-1, a user provides user input in the form of a thumb 502 to the electronic device 102. For example, the user presses their thumb 502 on the display 224 (e.g., the cover layer 302) of the electronic device 102 within the active area 404. In some examples, the user may hover their thumb immediately above the display, such that no portion of the thumb 502 comes in contact with the display 224. In additional examples, the user may provide other, or additional, user input including other fingers, a palm, and so on.

In this example, as illustrated in detail view 500-2, the touch-input sensor 306 detects the thumb 502 pressed upon the display 224. The touch-input sensor 306, in an example, may detect the thumb 502 using capacitive touch technology. For example, a controller and/or processor can monitor a conductive matrix (e.g., diamond grid layout, interleaved layout, angled cross pattern layout) by scanning electrical charges or voltages within the matrix to detect variations therein and, thereby, identify a touch input. The touch-input sensor 306 using capacitive touch technology may allow for sub-frame digitization, providing higher resolution, higher precision, and quicker response times than other touch-based technology.

In some examples, the biometric authentication manager 216 may be configured to analyze touch inputs received at the touch-input sensor 306 and identify touch-input false positives. Touch input false positives may include any unintentional, or undesired, input received at the touch-input sensor 306 of the electronic device 102. For example, the display 224 of the electronic device 102 in a pocket of the user's clothing may come in contact with fabric, activating the touch-input sensor 306. In another example, a user may reach into a pocket to grab their electronic device 102 and place it down on a table, touching the display 224 without the desire to authenticate themself. In these and other examples, the biometric authentication manager 216 may be configured to analyze touch inputs received at the touch-input sensor and identify false positives based on a number of events or characteristics, including a duration of sustained contact of the user input with the display 224, an orientation or acceleration of the electronic device 102, a motion of the user input across the display 224, a size of the user input on the display 224, and so forth. The biometric authentication manager 216 may use one or more of machine-learned techniques, heuristic algorithms, or any other algorithms to analyze and identify touch-input false positives.

As illustrated in detail view 500-3, before, during, and/or after the biometric authentication manager 216 attempts to identify touch input false positives, the touch-input sensor 306 generates a heatmap 504. The heatmap 504 may include a measurement of a capacitive coupling of user input, indicating an area of sustained contact ("contact area") between the thumb 502 and the display 224. As described herein, sustained contact may be any duration of time sufficient for the electronic device 102, or components therein (e.g., the touch-input sensor 306), to register, process, and/or analyze user input.

In implementations, one or more regions 506 within the heatmap 504 may indicate no contact area. Alternatively, one or more regions within the heatmap 504 may indicate a contact area ("contact region 508") of varying magnitudes, correlating to, as non-limiting examples, a magnitude of pressure applied by the thumb 502 on the display 224, a degree of coverage of the thumb 502 on the display 224, and so on.

In aspects, responsive to and based on the heatmap 504, the biometric authentication manager 216 is configured to outline the contact region 508 and generate a shape corresponding to the contact area. For example, the biometric authentication manager 216 having a line drawing algorithm (e.g., a heuristic algorithm, a machine-learned algorithm) is configured to trace one or more lines, outlining the contact region 508 and generating a shape corresponding to the contact area. The algorithm can further be configured to generate a plurality of shapes corresponding to multiple contact regions. The biometric authentication manager 216 can implement the line drawing algorithm depending on a resolution of the heatmap 504 produced by the touch-input sensor 306.

In additional aspects, responsive to and based on the heatmap 504, the biometric authentication manager 216 can process (e.g., image processing) the heatmap 504. Processing performed by the biometric authentication manager 216 can denoise, blur, deblur, sharpen, edge detect, and so forth the heatmap 504. In implementations, the biometric authentication manager 216 can employ a convolution filter configured to use local neighbors to compute a weighted average and, thereby, adjust the heatmap 504. For instance, the convolution filter can implement a gaussian blur to reduce noise in the heatmap. As an example, the convolution filter may replace the magnitude of a point with a magnitude value computed with an eight neighbors magnitude value. In an additional example, the biometric authentication manager 216 can implement a nearest neighbor algorithm to determine an overlap. In another example, the biometric authentication manager 216 may include a machine-learned module configured to process the heatmap 504.

After processing the heatmap 504, the biometric authentication manager 216 may generate an isosurface. For example, the biometric authentication manager 216 may pass the heatmap 504 to processors 204, an IC, or a SoC to generate a hardware-accelerated isosurface for rapid input/output testing (e.g., using a very high-speed integrated circuit hardware description language (VHDL)). The isosurface may be generated and/or processed using any combination of interpolation, thresholding, alpha-blending, and so forth. In addition, the biometric authentication manager 216 may employ an algorithm (e.g., painter's algorithm) configured to identify one or more shapes of interest.

Through any combination of the line drawing algorithm, the processing techniques, the isosurface generation, and/or the shape identification, the biometric authentication manager 216 can generate one or more shapes corresponding to one or more contact areas. In some examples, the shapes may be morphous, forming regular two-dimensional shapes. In additional examples, the shapes may be amorphous, forming irregular two-dimensional shapes. In both examples, one or more of the shapes may substantially match the one or more contact areas, defining similar shapes or congruent shapes.

Further to the above descriptions, the biometric authentication manager 216 can be configured to resize one or more shapes. For example, the biometric authentication manager 216 can resize a shape, such that the shape is still similar to a corresponding contact area, but smaller in area. In so doing, a first contour of the shape may be within a second contour of the corresponding contact area. As a result, the first contour of the shape may be offset from the second contour by a predetermined distance (e.g., between one and twenty pixels). This predetermined distance may be based on a number of factors including, as non-limiting examples, a measurement of ambient light in an environment within which the electronic device 102 resides, an amount of potential light leakage from the display 224, a current brightness setting of the display 224, a determined curvature of the user input (e.g., thumb 502), a curvature of the display 224, a directly proportional relationship between a leakage of light (e.g., an acceptable level of light leakage) and the contact area, and so on.

Further, the biometric authentication manager 216 can identify one or more locations of user input (e.g., thumb 502) on the display 224, as detected by the touch-input sensor 306, and determine one or more regions ("determined regions") within the pixel array 310 having one or more pixel circuits corresponding to (e.g., within, underneath, near) the one or more locations of the user input on the display 224. For example, collocation may include, or be established by, centroid coordinates of one determined region being within a second contour of a corresponding contact area, matching centroid coordinates between one determined region and a corresponding contact area, and so on.

In additional examples, the biometric authentication manager 216 can generate a shape that is not similar nor congruent to a corresponding contact area. For instance, the biometric authentication manager 216 may approximate a shape for a corresponding contact area. As an example, the biometric authentication manager 216 may approximate a contact area as being substantially oval. In another example, depending on a size, location, and/or type of the user input, the biometric authentication manager 216 may use a preset shape (e.g., a circle, a rectangle) that fits within a second contour of a corresponding contact area.

Figure 6:
FIG. 6 illustrates an example implementation of an example display panel in which spatially-configurable localized illumination for biometric authentication can be implemented.

FIG. 6 illustrates an example implementation 600 of an example display panel in which spatially-configurable localized illumination for biometric authentication can be implemented. In this example, the display panel 308 includes similar components to those described and illustrated with respect to the display panel 308 of FIG. 3, with some additional detail. The display panel 308 can include additional components, which are not illustrated in FIG. 6. Further, in other implementations, the electronic device 102 may utilize display technology altogether different than the display panel 308.

The display panel 308 includes the pixel array 310 having pixel circuits 602 (e.g., pixel circuit 602-1, pixel circuit 602-2). The pixel array may include a plurality (e.g., hundreds, thousands, millions) of pixel circuits 602, but only fifteen pixel circuits 602 are illustrated in FIG. 6 for sake of clarity and conciseness. The pixel circuits 602 are operably coupled to drivers (e.g., row line drivers 318, column line driver 316). For example, the pixel circuits 602 are operably coupled to row line drivers 318 (e.g., row line driver 318-1, row line driver 318-2) via row lines 604. Further, the pixel circuits 602 are operably coupled to the column line driver 316 via column lines 606. Although two row line drivers 318 are illustrated and only one column line driver 316 is illustrated, the display panel 308 may include a plurality of row line drivers 318 and column line drivers 316. As non-limiting examples, the row line drivers 318 may be implemented as gate line drivers, scan line drivers, and/or emission control drivers. As a non-limiting example, the column line driver 316 may be implemented as a data line driver.

The display panel 308 further includes the DDIC 312 having the column line driver 316 and the timing controller 314. The timing controller 314 can provide interfacing functionality between the processors 204 and the drivers (e.g., column line driver 316, row line drivers 318). The timing controller 314 generally accepts commands and data from the processors 204, generates signals with appropriate voltage, current, timing, and demultiplexing, and passes the signals to the drivers.

The drivers may pass time-variant and amplitude-variant signals (e.g., voltage signals, current signals) to one or more pixel circuits 602 in the pixel array 310 via row lines and/or column lines. For example, a data line driver passes signals containing voltage data to the pixel array 310 to control the luminance of one or more LEDs in the pixel circuits 602. A scan line driver passes a signal to enable or disable one or more LEDs from receiving the data voltage from the data line driver. An emission control driver supplies an emission control signal to the pixel array 310. Together, the drivers control the pixel array 310 to generate light to create an image on the display panel 308.

In aspects, based on one or more shapes generated by the biometric authentication manager 216, the biometric authentication manager 216 instructs (e.g., directly, indirectly via processors 204) the DDIC 312 to alter a brightness at the one or more determined regions within the pixel array 310 of the display panel 308. In some examples, altering a brightness may include increasing a luminance of one or more determined regions, while maintaining a luminance of the display for regions around the determined regions. For example, under the instruction of the biometric authentication manager 216, the DDIC 312 can increase the luminosity of individual LEDs within the one or more regions from a low brightness to a high brightness.

FIG. 7 illustrates an example implementation 700 of the example electronic device 102 having the display panel 308 configured to implement spatially-configurable localized illumination for biometric authentication. As illustrated in detail view 700-1, the user provides user input in the form of the thumb 502 to the electronic device 102. As illustrated in detail view 700-2, the touch-input sensor 306 (not illustrated) detects the thumb 502 pressed upon the display 224 and generates a heatmap 504 with the contact region 508 indicative of the contact area. Based on the generated heatmap 504 and the contact region 508, the biometric authentication manager 216 generates a shape corresponding to the contact area. The biometric authentication manager 216 further identifies a location of the thumb 502 on the display 224, as detected by the touch-input sensor 306, and determines a region ("determined region") within the pixel array 310 having one or more pixel circuits corresponding to the location of the thumb 502 on the display 224.

As illustrated in detail view 700-3, the biometric authentication manager 216 instructs the DDIC 312 to alter a brightness of the determined region in the display panel 308, increasing the luminance of the LEDs in the determined region. As described herein, a determined region in which a luminance of pixels is increased is referred to as a high-luminance region. A high-luminance region 702 may be collocated with and similar in shape to the contact area between the thumb 502 and the display 224. The luminosity of the high-luminance region 702, expressed in candela per square meter ("nit"), may be hundreds to thousands of nits greater in luminosity than other portions of the display panel ("background region") during biometric authentication. For example, a high-luminance region may start at a luminosity of 200 nits and increase to a luminosity of 1200 or more nits. A background region (e.g., a non-high-luminance region)

surrounding the high-luminance region may be configured to retain, or reduce, the starting luminosity value of zero nits (e.g., a dark mode).

In so doing, during biometric authentication, the thumb 502 may experience amplified illumination from the high-luminance region 702. Furthermore, due to the high-luminance region 702 being collocated and similarly shaped to the thumb 502, light radiating from the high-luminance region 702 can be sufficiently covered by the thumb 502 so as to minimize potential light leakage visible to users, increasing user experience.

Light incident at the skin surface of the thumb 502 experiences reflection and scattering. The reflected light from the skin surface of the thumb 502 may be directly proportional to the amount of light irradiating thereupon. Utilizing the reflected light, a biometric authentication system having (e.g., communicatively coupled to) one or more of the sensors 222, such as a fingerprint sensor, can capture an image of the thumb 502.

FIG. 8 illustrates an example implementation 800 of the example electronic device 102 including a biometric authentication system having a fingerprint sensor configured to receive a reflection of user input illuminated by spatially-configurable localized illumination. As illustrated, the electronic device 102 includes an optical UDFPS 802 disposed in a bottom portion of the display 224 within the housing of the electronic device 102. As illustrated, the optical UDFPS 802 may be integrated in one or more layers of the display 224. Although the optical UDFPS 802 is described as being disposed in the bottom portion of the display 224, the optical UDFPS 802 may be disposed in any portion of the display 224.

In such a configuration, the optical UDFPS 802 can capture light reflected from the thumb 502 and transmitted through the display 224. The biometric authentication manager 216 can then generate (e.g., capture) a frame ("verify print") containing a visual representation of the thumb 502 having a fingerprint. The biometric authentication manager 216 can then compare the verify print to an enrolled print of a previously authenticated user. For example, the biometric authentication manager 216 can compare the verify print to the enrolled print based on whether information (e.g., biometric identifiers, minutia) inferred from the prints match. If the comparison succeeds, then the biometric authentication system can authenticate the user.

Provided that the biometric authentication manager 216 determines that the verify print indicates an authorized user, then the biometric authentication system may permit the user access (e.g., unlock) one or more resources (e.g., a program, an internet-enabled account, a peripheral input device, an operating system) of the electronic device 102.

Although techniques have been described herein in reference to, or for use by, an optical UDFPS, at least some of the aforementioned techniques can also be implemented with any of a variety of biometric sensors, including an ultrasonic fingerprint sensor. For example, the biometric authentication manager 216 can be configured to generate a shape corresponding to a contact area, using any touch-input sensor, and enable an ultrasonic fingerprint sensor to more quickly and reliably locate user input. Further, although techniques have been described herein in reference to, or for use by, biometric authentication systems, the techniques can be applied to any of a variety of other contexts outside of biometric authentication. Additionally, although techniques have been described herein in reference to, or for use by, a single electronic device (e.g., electronic device 102), the techniques are not limited to being implemented only on one electronic device.

Example Methods

FIGS. 9 and 10 depict methods 900 and 1000, respectively, that enable spatially-configurable localized illumination for biometric authentication. These methods are shown as sets of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion reference may be made to the example implementation 100 of FIG. 1 and entities detailed in FIGS. 2-8, reference to which is made for example only. The techniques are not limited to performance by one entity or multiple entities operating on one device. Method 1000 is supplemental to, and is optionally performed in conjunction with, the method 900.

At 902, a biometric authentication system receives, at a region of a touch-sensitive display, a fingertip touch input from a user, the fingertip touch input in sustained contact with the touch-sensitive display. For example, user input, including a thumb (e.g., thumb 502), of a user may come in sustained contact with a touch-sensitive display (e.g., display 224). A touch-input sensor (e.g., touch-input sensor 306) may receive (e.g., detect) the user input.

At 904, the biometric authentication system determines, responsive to receiving and based on the fingertip touch input, a shape of a contact area of the sustained contact with the touch-sensitive display. For example, a biometric authentication manager (e.g., biometric authentication manager 216), using any of a variety of algorithms (e.g., machine-learned techniques, convolution filters), determines a shape corresponding to the contact area. The shape may be regular or irregular, being substantially similar, or even congruent, with the contact area.

At 906, the biometric authentication system alters, based on the determined shape of the contact area of the sustained contact, a brightness of the region of the touch-sensitive display, the altering sufficient to enable the biometric authentication system to receive a reflection of the fingertip touch input (e.g. with a desired illumination level). For example, the biometric authentication manager instructs a DDIC (e.g., DDIC 312) to increase a brightness of a region (e.g., high-luminance region 702) within a display panel (e.g., display panel 308) collocated with the contact area. The increase in brightness is effective to facilitate fingerprint sensing by the biometric authentication system, including an optical UDFPS (e.g., optical UDFPS 802).

At 908, the biometric authentication system receives the reflection of the fingertip touch input. For example, the optical UDFPS captures reflected light from the thumb. The biometric authentication manager can then generate a verify print containing a visual representation of the thumb having a fingerprint.

At 910, the biometric authentication system analyzes, responsive to receiving the reflection, the reflection effective to enable the biometric authentication system to authenticate the user. For example, the biometric authentication manager can compare the verify print to an enrolled print based on whether information inferred from the prints match. If the comparison succeeds, then the biometric authentication system can authenticate the user.

As mentioned, the biometric authentication system may implement spatially-configurable localized illumination based on an optional method 1000 described with respect to FIG. 10. At 1002, a biometric authentication system receives, at a second region of a touch-sensitive display, a second fingertip touch input from a user, the second fingertip touch input in a second sustained contact with the touch-sensitive display. For example, user input, including an index finger, of a user may come in sustained contact with the touch-sensitive display. The touch-input sensor may receive (e.g., detect) the user input.

At 1004, the biometric authentication system determines, responsive to receiving and based on the second fingertip touch input, a second shape of a second contact area of the second sustained contact with the touch-sensitive display. For example, the biometric authentication manager, using any of a variety of algorithms (e.g., machine-learned techniques, convolution filters), determines a second shape corresponding to the second contact area. The second shape may be regular or irregular, being substantially similar, or even congruent, with the second contact area.

At 1006, the biometric authentication system alters, based on the second determined shape of the second contact area of the second sustained contact, a second brightness of the second region of the touch-sensitive display, the altering sufficient to enable the biometric authentication system to receive a second reflection of the second fingertip touch input (e.g. with a desired illumination level of the finger). For example, the biometric authentication manager instructs the DDIC to increase a second brightness of a second region within the display panel collocated with the second contact area. The increase in the second brightness is effective to facilitate fingerprint sensing by the biometric authentication system, including the optical UDFPS.

At 1008, the biometric authentication system receives the second reflection of the second fingertip touch input. For example, the optical UDFPS captures the second reflected light from the index finger. The biometric authentication manager can then generate a second verify print containing a visual representation of the index finger having a second fingerprint.

At 1010, the biometric authentication system analyzes, responsive to receiving the second reflection, the second reflection effective to enable the biometric authentication system to authenticate the user. For example, the biometric authentication manager can compare the second verify print to a second enrolled print based on whether information inferred from the prints match. If the comparison succeeds, then the biometric authentication system can authenticate the user.

Example Implementations

Figure 11:
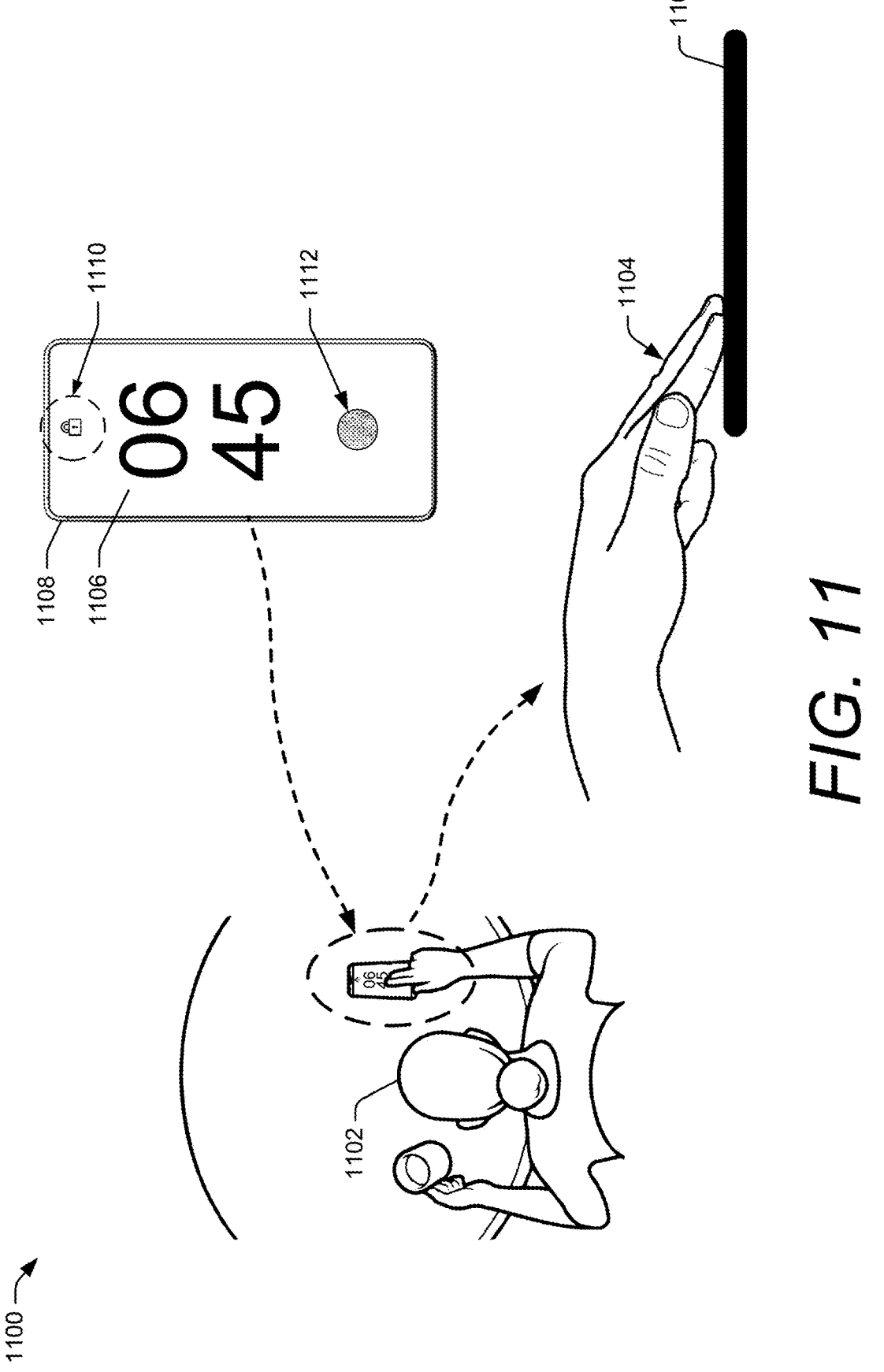
FIG. 11 illustrates an example implementation of an example electronic device configured to implement spatially-configurable localized illumination for biometric authentication.

FIG. 11 illustrates an example implementation 1080 of an example electronic device configured to implement spatially-configurable localized illumination for biometric authentication. The example implementation illustrates a user 1102 providing user input 1104, such as two fingertips, at a display 1106 (e.g., display 224) of an electronic device 1108 (e.g., electronic device 102) to authenticate herself. In this particular example, the user 1102 is attempting to authenticate herself to an operating system of the electronic device 1108.

In aspects, the electronic device 1108 may start in a locked state 1110 prior to the user providing user input 1104. In the locked state 1110, the electronic device 1108 may display a prompt to the user 1102 requesting she provide user input 1104, including touch input, in order to authenticate herself. The prompt may be an on-screen icon 1112 indicating a method of biometric authentication, such as fingerprint authentication.

Figure 12:
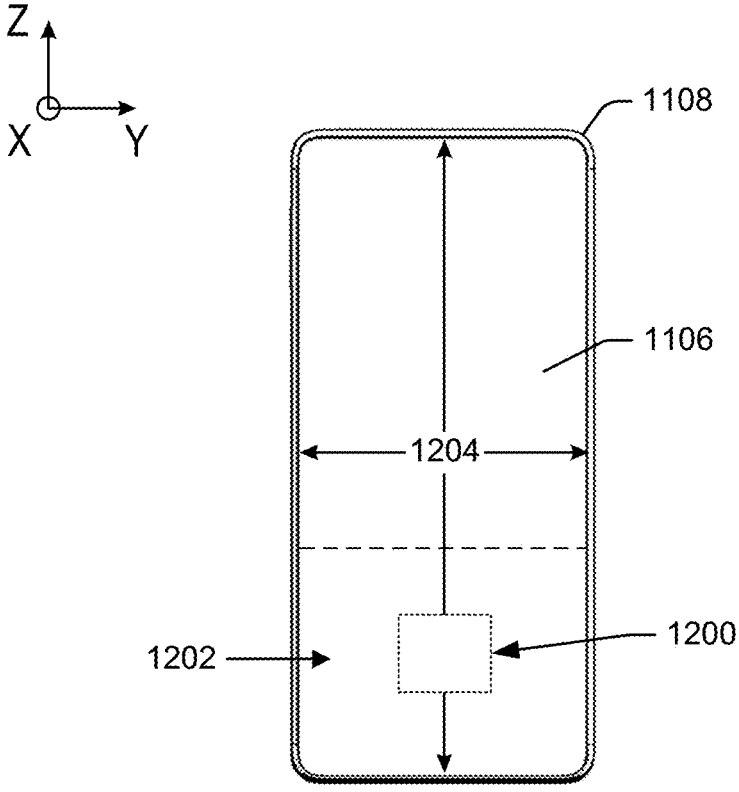
FIG. 12 illustrates the example electronic device having an optical under-display fingerprint sensor (UDFPS) in a bottom portion of an active area of the display from FIG. 11.

In continuation of the previous example, FIG. 12 illustrates the example electronic device 1108 having an optical UDFPS 1200 (e.g., optical UDFPS 802) in a bottom portion 1202 of an active area 1204 of the display 1106 from FIG. 11. The optical UDFPS 1200 may be disposed underneath all layers of the display 1106. In such a configuration, a user 1102 may provide user input 1104 anywhere within the bottom portion 1202 of the active area 1204 so that the optical UDFPS 1200 can capture an image of the user input 1104.

Turning back to FIG. 11, momentarily, responsive to the electronic device 1108 displaying the prompt, the user 1102 may provide user input 1104 by touching two fingertips on the display 1106 within the bottom portion 1202 of the active area 1204. In one example, if the user 1102 sustains the touch input, a biometric authentication manager (e.g., biometric authentication manager 216) may determine, at least in part, that the touch input is not a false positive. Concurrent with, or in response to, the determination that the touch input is not a false positive, a touch-input sensor (e.g., touch-input sensor 306) may generate a heatmap (e.g., heatmap 504).

Figure 13:
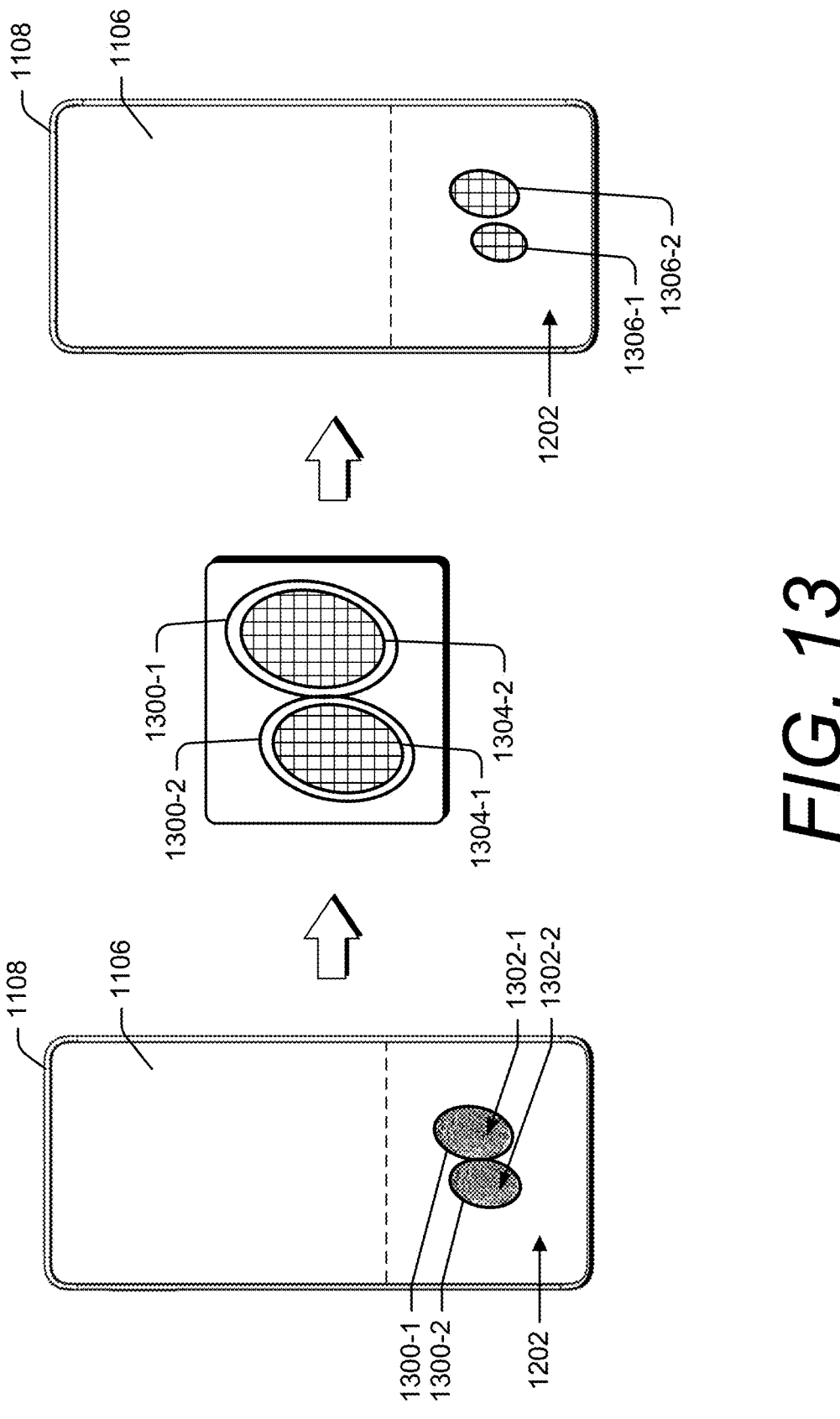
FIG. 13 illustrates example techniques of determining a shape and location of user input to provide spatially-configured localized illumination.

Continuing with this example, FIG. 13 illustrates example techniques of determining a shape and location of user input 1104 to provide spatially-configured localized illumination. In aspects, the biometric authentication manager may determine shapes for the user input 1104 in contact with the display, including two shapes 1300 (e.g., shape 1300-1, shape 1300-2) outlining the two fingertips having fingerprints 1302 (e.g., fingerprint 1302-1, fingerprint 1302-2), respectively. Further, the biometric authentication manager may resize the two shapes 1300 to two smaller shapes 1304 (e.g., shape 1304-1, shape 1304-2) by reducing an area of the two shapes 1300. Based on the two smaller shapes 1304, the biometric authentication manager may instruct a DDIC (e.g., DDIC 312) to generate high-luminance regions 1306 (e.g., high-luminance region 1306-1, high-luminance region 1306-2) on the display 1106 collocated with and similar to a contact area between the two fingertips and the display 1106. In this way, light radiating from the high-luminance regions can illuminate the user input to facilitate fingerprint sensing by the optical UDFPS. If the biometric authentication manager can authenticate the user through analysis of the fingerprints, then the biometric authentication manager can transfer the electronic device 1108 from the locked state 1110 to an unlocked state.

Figure 14:
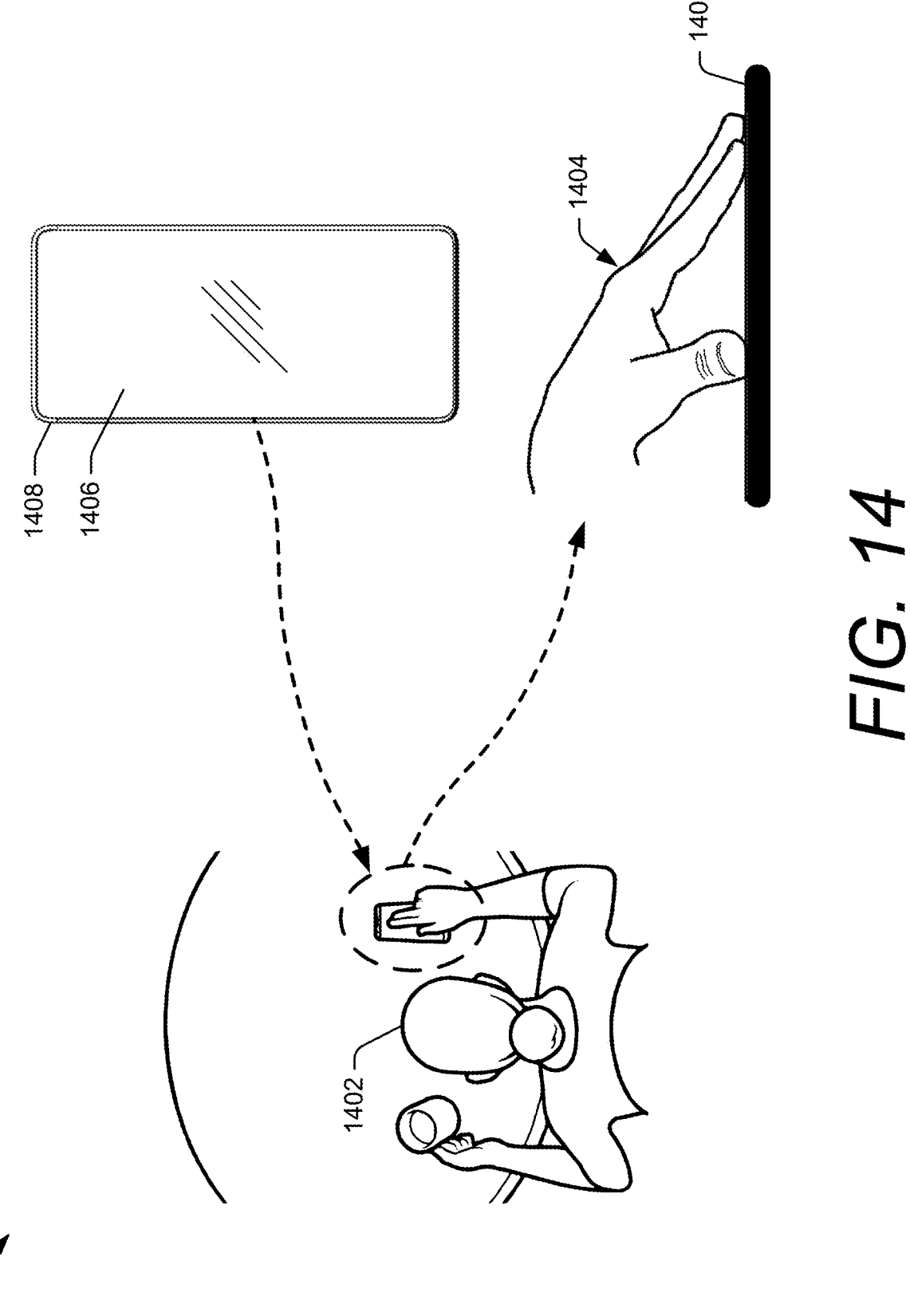
FIG. 14 illustrates another example implementation of an example electronic device configured to implement spatially-configurable localized illumination for biometric authentication.

FIG. 14 illustrates another example implementation 1400 of an example electronic device configured to implement spatially-configurable localized illumination for biometric authentication. The example implementation illustrates a user 1402 providing user input 1404, such as three fingertips, at a display 1406 (e.g., display 224) of an electronic device 1408 (e.g., electronic device 102) to authenticate herself. In this particular example, the user 1402 is attempting to authenticate herself to an operating system of the electronic device 1408.

In aspects, the electronic device 1408 may start in a locked state prior to the user 1402 providing user input 1404. In the locked state, the display 1406 of the electronic device 1408 may be dark (e.g., a black screen, a blank screen). In order to transfer the electronic device 1408 from the locked state to an unlocked state, the user 1402 may provide user input 1404, including touch input, in order to authenticate herself.

Figure 15:
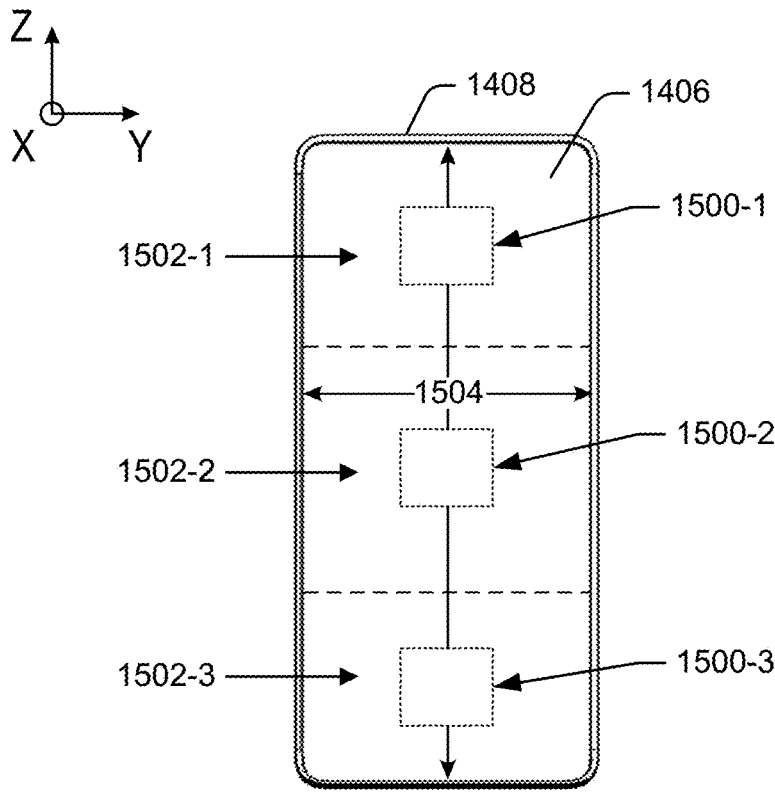
FIG. 15 illustrates the example electronic device having an optical UDFPS in a bottom portion of an active area of the display from FIG. 14.

In continuation of the previous example, FIG. 15 illustrates the example electronic device 1408 having an optical UDFPS 1500 (e.g., optical UDFPS 1500-1, optical UDFPS 1500-2, optical UDFPS 1500-3) for each portion 1502 (e.g., a top portion 1502-1, a middle portion 1502-2, a bottom portion 1502-3) of an active area 1504 of the display 1406 from FIG. 14. At least one optical UDFPS 1500 may be disposed underneath all layers of the display 1406. In such a configuration, a user 1402 may provide user input 1404 anywhere within the active area 1504 so one or more optical UDFPS 1500 can capture an image of the user input 1404.

Turning back to FIG. 14, momentarily, the user 1402 may provide user input 1404 by touching three fingertips on the display 1406 within the active area 1504. In one example, if the user 1402 sustains the touch input, a biometric authentication manager (e.g., biometric authentication manager 216) may determine, at least in part, that the touch input is not a false positive. Concurrent with, or in response to, the determination that the touch input is not a false positive, a touch-input sensor (e.g., touch-input sensor 306) may generate a heatmap (e.g., heatmap 504).

Figure 16:
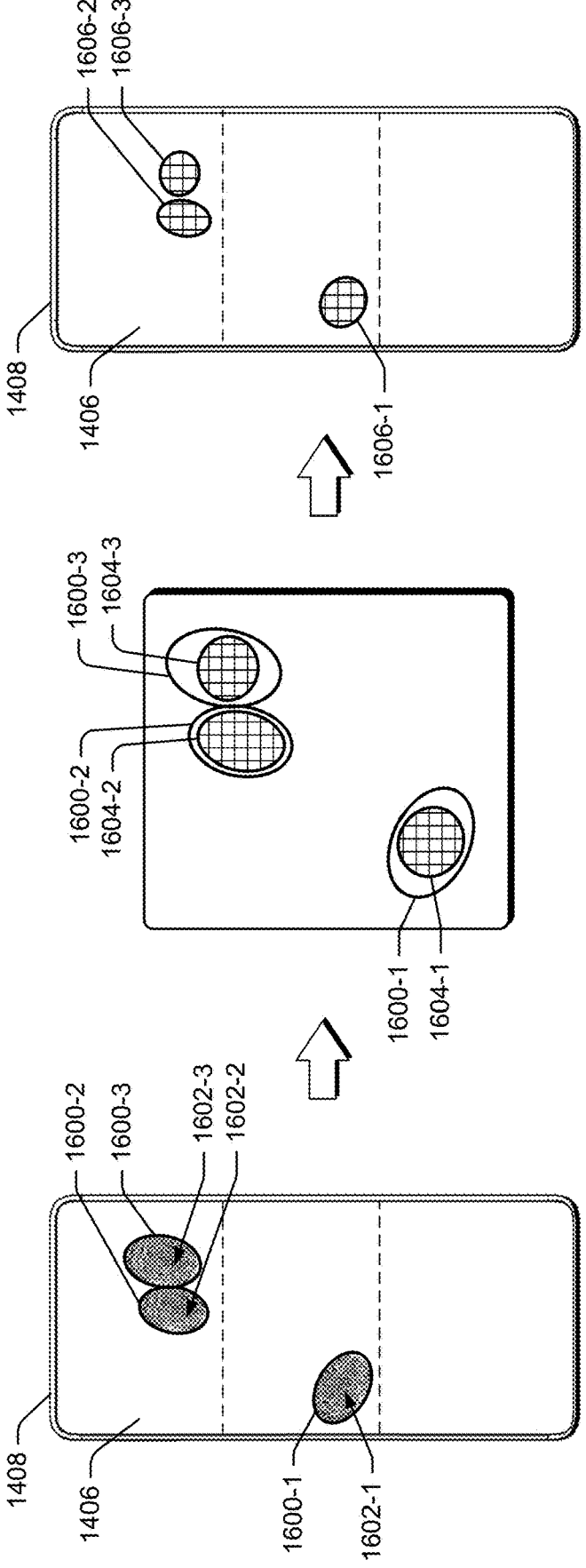
FIG. 16 illustrates example techniques of determining a shape and location of user input to provide spatially-configured localized illumination.

Continuing with this example, FIG. 16 illustrates example techniques of determining a shape and location of user input 1404 to provide spatially-configured localized illumination. In aspects, the biometric authentication manager may determine shapes for the user input 1404 in contact with the display, including three shapes 1600 (e.g., shape 1600-1, shape 1600-2, shape 1600-3) outlining the three fingertips having fingerprints 1602 (e.g., fingerprint 1602-1, fingerprint 1602-2, fingerprint 1602-3), respectively. The biometric authentication manager may resize shape 1600-2 into a smaller shape 1604-2. The smaller shape 1604-2 may be collocated with and similar to, but smaller in area than, shape 1600-2. The biometric authentication manager may replace shape 1600-1 and shape 1600-3 with preset shape 1604-1 and preset shape 1604-3, respectively. Preset shape 1604-1 and preset shape 1604-3 may be collocated with and smaller in area than shape 1600-1 and shape 1600-3, respectively, but not similar thereto. Based on the three shapes 1604, the biometric authentication manager may instruct a DDIC (e.g., the DDIC 312) to generate high-luminance regions 1606 (e.g., high-luminance region 1606-1, high-luminance region 1606-2, high-luminance region 1606-3) on the display 1406 collocated with and similar to a contact area between the three fingertips and the display 1106. In this way, light radiating from the high-luminance regions can illuminate the user input to facilitate fingerprint sensing by the optical UDFPS. If the biometric authentication manager can authenticate the user through analysis of the fingerprints, then the biometric authentication manager can transfer the electronic device 1408 from the locked state to the unlocked state.

Figure 17:
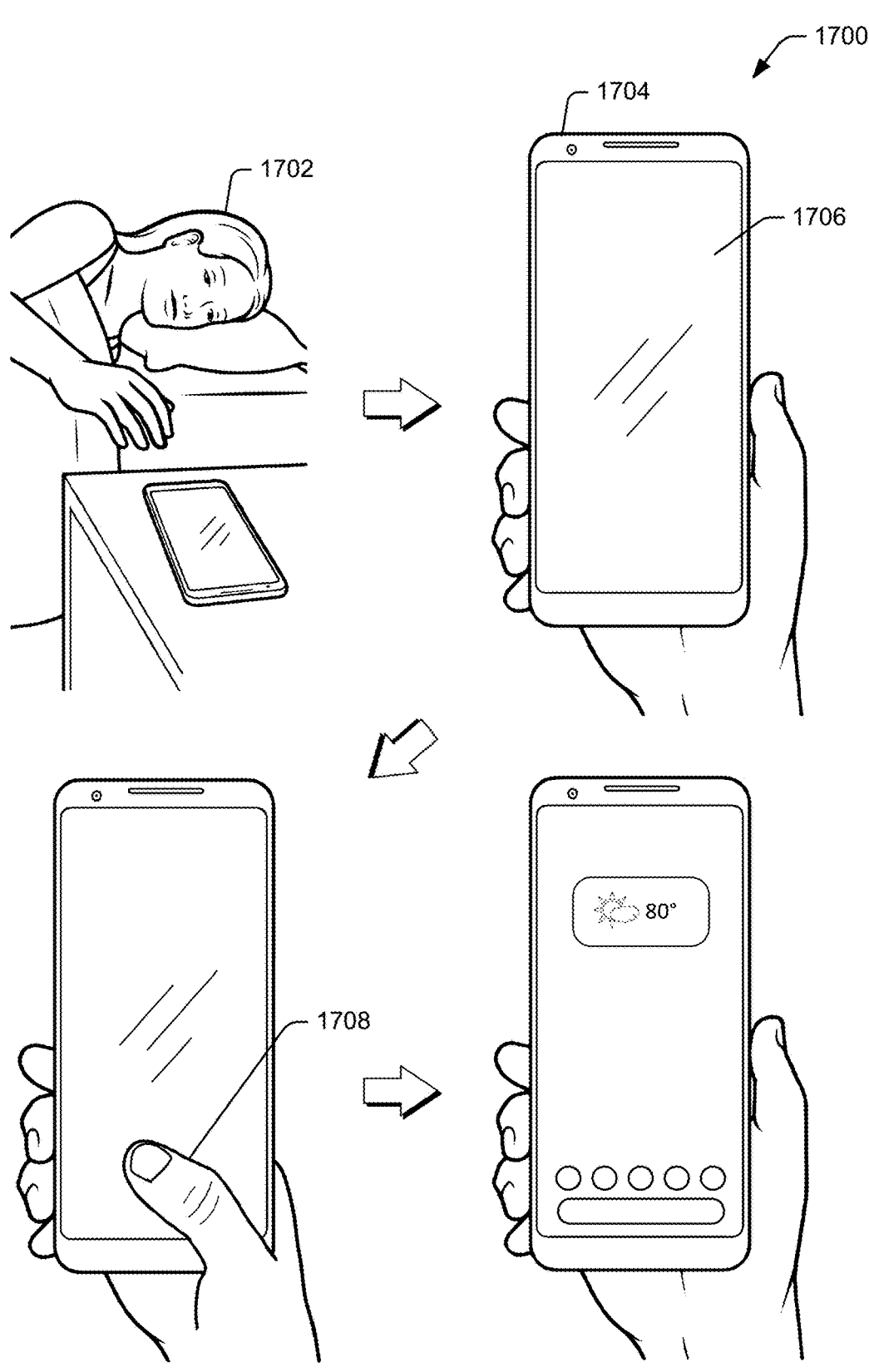
FIG. 17 illustrates an example implementation of an example electronic device configured to implement spatially-configurable localized illumination for biometric authentication.

FIG. 17 illustrates an example implementation 1700 of an example electronic device configured to implement spatially-configurable localized illumination for biometric authentication. As illustrated, a user 1402, recently awoken in the early hours of the morning, is laying down in her bed in a dark room. Thinking of the day's events, the user 1402 may desire to view a weather forecast on her electronic device 1704 (e.g., electronic device 102), which is resting on a nearby nightstand. To access a weather resource on her electronic device 1704, the user 1702 may first need to authenticate herself. As a result, she may pick up her electronic device 1704 and look at a display 1706 of the electronic device 1704. By placing a thumb 1708 on the display 1706, the electronic device 1704 may commence biometric authentication.

Biometric authentication may include a localized region (e.g., high-luminance region 702), spatially configured to the thumb 1708, on the display 1706 increasing in brightness. Since the localized region is spatially configured on display 1706 to the thumb 1708, no high-luminance light may leak around the thumb 1708 of the user 1702. Moreover, the user 1702 is afforded the opportunity to place her thumb 1708 anywhere on the display 1706 to unlock her electronic device 1704. As a result, the electronic device 1704 can authenticate the user 1702 and allow her access to the weather resource to view a weather forecast.

A biometric authentication system using the systems and techniques described herein can provide many benefits, including, as non-limiting examples, reduced processing latency, reduced power expenditure, and better user experience. For example, in comparison to a biometric authentication system configured to utilize a display to, first, illuminate a user input and then, second, utilize an optical UDFPS for to detect the user input, a biometric authentication system using the systems and techniques described herein can utilize a touch-input sensor to detect user input. Using the touch-input sensor, the biometric authentication system can rely on a low-power resource to more accurately identify and locate user input, without having to illuminate (e.g., power on) the display. Further, the biometric authentication system can more quickly locate a position of user input in a verify print produced by an optical UDFPS when informed by a touch-input sensor. Whereas, in at least some other configurations, a biometric authentication system may utilize image detection on a low-resolution verify print to identify a location of user input. Additionally, a biometric authentication system using the techniques described herein can more quickly ascertain an orientation of the user input when informed by the touch-input sensor. In so doing, processing latency, as well as power expenditure, can be reduced, which can further increase user experience.

A biometric authentication system using the systems and techniques described herein can further be configured to alter a brightness of a touch-sensitive display (e.g., at high-luminance regions 1306) responsive to the biometric authentication system receiving a reflection of user input (e.g., at an optical UDFPS) or analyzing the user input. For example, a biometric authentication system may be configured to reduce a brightness of a high-luminance region responsive to an optical UDFPS receiving a reflection of user input, such that an entire display has a uniform brightness.

In addition to the above descriptions, a fingerprint sensor (e.g., optical UDFPS 802, an ultrasonic fingerprint sensor), a touch-input sensor (e.g., touch-input sensor 306), and processors (e.g., processors 204), as well as communication techniques therebetween, can be optimized to further expedite biometric authentication. For example, a biometric authentication system having a biometric authentication manager (e.g., biometric authentication manager 216) can select a subregion, based on location coordinates received by the touch-input sensor, within a verify print that includes a focused (e.g., cropped) view of the user input. This subregion selection can improve synchronous serial communication (SPI) direct memory access (DMA) transfer speed, as well as reduce power. In this way, the biometric authentication manager can analyze the focused view of the verify print having user input for biometric identifiers more quickly and reliably.

Further to the above descriptions, a biometric authentication system using the systems and techniques described herein can provide higher accuracy. For example, determining a shape of a contact area of sustained contact with a touch-sensitive display allows for more accurate shape and location estimation than, for example, centroid approximation. Centroid approximation of a touch input may provide accurate estimation of a singular point for the touch input, but is sub-optimal in ascertaining an overall shape, size, and location of the touch input. Whereas, determining a shape of a contact area of sustained contact with a touch-sensitive display using a heatmap generated by a touch-input sensor allows for greater accuracy.

EXAMPLES

In the following section, examples are provided.

Example 1: A method comprising: receiving, at a region of a touch-sensitive display, a fingertip touch input from a user, the fingertip touch input in sustained contact with the touch-sensitive display; determining, responsive to receiving and based on the fingertip touch input, a shape of a contact area of the sustained contact with the touch-sensitive display; altering, based on the determined shape of the contact area of the sustained contact, a brightness of the region of the touch-sensitive display, the altering sufficient to enable a biometric authentication system to receive a reflection of the fingertip touch input; receiving the reflection of the fingertip touch input; and analyzing, responsive to receiving the reflection, the reflection at the biometric authentication system effective to enable the biometric authentication system to authenticate the user.

Example 2: The method as described in any of the previous examples, further comprising, prior to determining the shape of the contact area or prior to altering the brightness of the region, determining that a resource of a computing device associated with the touch-sensitive display is locked from access.

Example 3: The method as described in any of the previous examples, wherein the resource of the computing device associated with the touch-sensitive display is a resource requiring authentication prior to the access, the resource requiring authentication being a computer program, an internet-enabled account, or a peripheral device.

Example 4: The method as described in any of the previous examples, wherein analyzing the reflection at the biometric authentication system is effective to unlock the resource.

Example 5: The method as described in any of the previous examples, further comprising determining, based on the shape of the contact area of the sustained contact, the region, and wherein altering the brightness of the region is responsive to determining the region based on the determined shape of the contact area.

Example 6: The method as described in any of the previous examples, wherein determining the shape of the contact area of the sustained contact determines the shape to be an irregular shape, and determining the region determines the region to be an irregularly-shape region.

Example 7: The method as described in any of the previous examples, wherein determining the region to be the irregularly-shaped region determines the irregularly-shaped region to have a first exterior contour bounded by a second exterior contour, the second exterior contour being of the irregular shape of the contact area.

Example 8: The method as described in any of the previous examples, wherein the first exterior contour and the second exterior contour are equal.

Example 9: The method as described in any of the previous examples, wherein the first exterior contour is within and not coincident with the second exterior contour.

Example 10: The method as described in any of the previous examples, wherein the first exterior contour is a fixed offset from and within the second exterior contour.

Example 11: The method as described in any of the previous examples, wherein the fixed offset is between one and twenty pixels.

Example 12: The method as described in any of the previous examples, wherein the fixed offset is based on a light leakage.

Example 13: The method as described in any of the previous examples, wherein the fixed offset is determined based on a brightness setting of the touch-sensitive display outside of the shape of sustained contact.

Example 14: The method as described in any of the previous examples, wherein the fixed offset is determined based on a directly proportional relationship between the light leakage and a size of the contact area.

Example 15: The method as described in any of the previous examples, wherein determining the shape of the contact area of the sustained contact determines the shape to be an irregular shape, and determining the region determines the region to be a regularly-shaped region having an external contour coincident with or within the irregular shape of the sustained contact.

Example 16: The method as described in any of the previous examples, wherein the determined regularly-shaped region is an ellipse or rectangle.

Example 17: The method as described in any of the previous examples, wherein determining the shape of the contact area of the sustained contact with the touch-sensitive display refrains from altering a brightness of the contact area or a second area surrounding the contact area.

Example 18: The method as described in any of the previous examples, wherein, during a first part of the sustained contact with the touch-sensitive display, the touch-sensitive display is at a first brightness mode, and wherein determining the shape of the contact area of the sustained contact with the touch-sensitive display maintains the first brightness mode or reduces, from the first brightness mode to a second, lower-brightness mode.

Example 19: The method as described in any of the previous examples, wherein the first brightness mode is a zero-brightness, dark mode for the touch-sensitive display.

Example 20: The method as described in any of the previous examples, wherein determining the shape of the contact area of the sustained contact with the touch-sensitive display is performed using a touch-input sensor configured to generate a heatmap.

Example 21: The method as described in any of the previous examples, wherein using a touch-input sensor configured to generate the heatmap refrains from illuminating a display to determine the shape of the contact area of the sustained contact with the touch-sensitive display.

Example 22: The method as described in any of the previous examples, wherein determining the shape of the contact area includes receiving a raw heatmap and determining, based on the raw heatmap, the shape of the contact area.

Example 23: The method as described in any of the previous examples, wherein altering the brightness of the region causes a localized high-brightness mode in the region.

Example 24: The method as described in any of the previous examples, further comprises generating, responsive to receiving and based on the reflection, a verify image.

Example 25: The method as described in any of the previous examples, wherein analyzing includes: comparing the verify image to an enrolled image; and calculating, based on the comparing, a probability of likeliness.

Example 26: The method as described in any of the previous examples, further comprising: receiving, at a second region of the touch-sensitive display, a second fingertip touch input from the user, the second fingertip touch input in a second sustained contact with the touch-sensitive display; determining, responsive to receiving the second touch input or the touch input, a second shape of a second contact area of the second sustained contact with the touch-sensitive display; altering, based on the second determined shape of the second contact area of the second sustained contact, a second brightness of a second region, the altering increasing the second brightness sufficient to enable the optical fingerprint system to receive a second reflection of the second fingertip touch input; receiving the second reflection of the second fingertip touch input; and analyzing, responsive to receiving the second reflection, the second reflection at the biometric authentication system effective to enable the optical fingerprint system to authenticate the user.

Example 27: The method as described in any of the previous examples, further comprising, responsive to the analyzing the second reflection of the first and second reflection, performing, using the biometric authentication system, authentication of the user based on the first reflection, the second reflection, or a combination thereof.

Example 28: The method as described in any of the previous examples, wherein performing authentication of the user is based on both the first reflection and the second reflection.

Example 29: The method as described in any of the previous examples, wherein performing authentication of the user is performed serially using one of the first or second reflections, and, responsive to a first performance indicating that the user is not authenticated, performing a second performance on a next of another of the first or second reflections.

Conclusion

Although implementations of techniques for, and apparatuses enabling, spatially-configurable localized illumination for biometric authentication have been described in language specific to features and/or methods, it is to be understood that the subject of the appended claims is not necessarily limited to the specific features or methods described. Rather, the specific features and methods are disclosed as example implementations enabling the implementation of spatially-configurable localized illumination for biometric authentication.

What is claimed is:

1. A method comprising:
   receiving, at a region of a touch-sensitive display, a fingertip touch input from a user, the fingertip touch input in sustained contact with the touch-sensitive display;
   determining, responsive to receiving and based on the fingertip touch input, a shape of a contact area of the sustained contact with the touch-sensitive display;
   altering, based on the determined shape of the contact area of the sustained contact, a brightness of the region of the touch-sensitive display, the altering sufficient to enable a biometric authentication system to receive a reflection of the fingertip touch input;
   receiving the reflection of the fingertip touch input; and
   analyzing, responsive to receiving the reflection, the reflection at the biometric authentication system effective to enable the biometric authentication system to authenticate the user.

2. The method as described in claim 1, further comprising, prior to determining the shape of the contact area or prior to altering the brightness of the region, determining that a resource of a computing device associated with the touch-sensitive display is locked from access.

3. The method as described in claim 2, wherein the resource of the computing device associated with the touch-sensitive display is a resource requiring authentication prior to the access, the resource requiring authentication being a computer program, an internet-enabled account, or a peripheral device.

4. The method as described in claim 3, wherein analyzing the reflection at the biometric authentication system is effective to unlock the resource.

5. The method as described in claim 1, further comprising determining, based on the shape of the contact area of the sustained contact, the region, and wherein altering the brightness of the region is responsive to determining the region based on the determined shape of the contact area.

6. The method as described in claim 5, wherein determining the shape of the contact area of the sustained contact determines the shape to be an irregular shape, and determining the region determines the region to be an irregularly-shape region.

7. The method as described in claim 6, wherein determining the region to be the irregularly-shaped region determines the irregularly-shaped region to have a first exterior contour bounded by a second exterior contour, the second exterior contour being of the irregular shape of the contact area.

8. The method as described in claim 7, wherein the first exterior contour is within and not coincident with the second exterior contour.

9. The method as described in claim 8, wherein the first exterior contour is a fixed offset from and within the second exterior contour.

10. The method as described in claim 9, wherein the fixed offset is based on a light leakage.

11. The method as described in claim 10, wherein the fixed offset is determined based on a brightness setting of the touch-sensitive display outside of the shape of sustained contact.

12. The method as described in claim 11, wherein the fixed offset is determined based on a directly proportional relationship between the light leakage and a size of the contact area.

13. The method as described in claim 1, wherein determining the shape of the contact area includes receiving a raw heatmap and determining, based on the raw heatmap, the shape of the contact area.

14. The method as described in claim 1, further comprising:

receiving, at a second region of the touch-sensitive display, a second fingertip touch input from the user, the second fingertip touch input in a second sustained contact with the touch-sensitive display;

determining, responsive to receiving the second touch input or the touch input, a second shape of a second contact area of the second sustained contact with the touch-sensitive display;

altering, based on the second determined shape of the second contact area of the second sustained contact, a second brightness of a second region, the altering increasing the second brightness sufficient to enable the biometric authentication system to receive a second reflection of the second fingertip touch input;

receiving the second reflection of the second fingertip touch input; and analyzing, responsive to receiving the second reflection, the second reflection at the biometric authentication system effective to enable the biometric authentication system to authenticate the user.

15. The method as described in claim 14, further comprising, responsive to the analyzing the second reflection of the first and second reflection, performing, using the biometric authentication system, authentication of the user based on the first reflection, the second reflection, or a combination thereof.

16. An electronic device comprising:

a touch-sensitive display;

one or more processors; and memory storing instructions that, when executed by the one or more processors, cause the one or more processors to:

receive, at a region of the touch-sensitive display, a fingertip touch input from a user, the fingertip touch input in sustained contact with the touch-sensitive display;

determine, responsive to the receipt and based on the fingertip touch input, a shape of a contact area of the sustained contact with the touch-sensitive display;

alter, based on the determined shape of the contact area of the sustained contact, a brightness of the region of the touch-sensitive display, the alteration sufficient to enable a biometric authentication system to receive a reflection of the fingertip touch input;

receive the reflection of the fingertip touch input; and analyze, responsive to the receipt of the reflection, the reflection at the biometric authentication system effective to enable the biometric authentication system to authenticate the user.

17. The electronic device of claim 16, wherein the instructions further cause the one or more processors to:

determine, based on the shape of the contact area of the sustained contact, the region, and wherein the alteration of the brightness of the region is responsive to the determination of the region based on the determined shape of the contact area.

18. The electronic device of claim 16, wherein the instructions further cause the one or more processors to:

receive, at a second region of the touch-sensitive display, a second fingertip touch input from the user, the second fingertip touch input in a second sustained contact with the touch-sensitive display;

determine, responsive to the receipt of the second touch input or the touch input, a second shape of a second contact area of the second sustained contact with the touch-sensitive display;

alter, based on the second determined shape of the second contact area of the second sustained contact, a second brightness of a second region, the alteration increasing the second brightness sufficient to enable the biometric authentication system to receive a second reflection of the second fingertip touch input;

receive the second reflection of the second fingertip touch input; and analyze, responsive to the receipt of the second reflection, the second reflection at the biometric authentication system effective to enable the biometric authentication system to authenticate the user.

19. The electronic device of claim 18, wherein the instructions further cause the one or more processors to:

responsive to the analysis of the second reflection of the first and second reflection, perform, using the biometric authentication system, an authentication of the user based on the first reflection, the second reflection, or a combination thereof.

20. The electronic device of claim 16, wherein the determination of the shape of the contact area includes receiving a raw heatmap and determining, based on the raw heatmap, the shape of the contact area.

\* \* \* \* \*